(12) United States Patent
Ohata et al.

(10) Patent No.: US 12,438,206 B2
(45) Date of Patent: Oct. 7, 2025

(54) SYSTEM AND METHOD FOR BATTERY MANAGEMENT

(71) Applicant: DENSO CORPORATION, Kariya (JP)

(72) Inventors: Takuya Ohata, Kariya (JP); Shogo Shigemori, Kariya (JP); Tatsuhiro Numata, Kariya (JP); Tetsuya Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 557 days.

(21) Appl. No.: 17/896,417

(22) Filed: Aug. 26, 2022

(65) Prior Publication Data

US 2023/0062093 A1   Mar. 2, 2023

(30) Foreign Application Priority Data

Aug. 30, 2021  (JP) .................................. 2021-139721

(51) Int. Cl.
*H01M 10/48* (2006.01)
*H01M 10/42* (2006.01)

(52) U.S. Cl.
CPC ....... *H01M 10/48* (2013.01); *H01M 10/4257* (2013.01); *H01M 2010/4271* (2013.01); *H01M 2010/4278* (2013.01); *H01M 2220/20* (2013.01)

(58) Field of Classification Search
CPC ............. H01M 10/4257; H01M 10/48; H01M 2010/4271; H01M 2010/4278; H01M 2220/20; Y02E 60/10
See application file for complete search history.

(56) References Cited

U.S. PATENT DOCUMENTS

| | | | |
|---|---|---|---|
| 8,399,115 | B2 | 3/2013 | Ellwanger |
| 2003/0109273 | A1* | 6/2003 | Ono .................. H04W 84/02 455/517 |

(Continued)

FOREIGN PATENT DOCUMENTS

| | | |
|---|---|---|
| JP | 2010142083 A | 6/2010 |
| JP | 2012083179 A | 4/2012 |
| KR | 10-2021-0066280 A | 6/2021 |

OTHER PUBLICATIONS

Townsend, Kevin; Cufi, Carles; Akiba; Davidson, Robert, translated by Mizuhara, bun, "Getting Started Bluetooth Low Energy"; First edition, O'Reilly Japan, Feb. 25, 2015, pp. 017-056, ISBN: 978-4-87311-713-2 (and partial English translation).

(Continued)

*Primary Examiner* — Victoria H Lynch
(74) *Attorney, Agent, or Firm* — Posz Law Group, PLC

(57) ABSTRACT

A battery management system includes at least one monitoring device and a controller. The monitoring device is arranged in a housing accommodating a battery to monitor the battery and acquires battery monitoring information that includes information indicating a state of the battery. The controller performs wireless communication with the monitoring device and executes a predetermined process based on the battery monitoring information. The monitoring device inserts the battery monitoring information in a packet and transmits the packet to the controller during a period of a connection process executed for establishing the wireless communication between the at least one monitoring device and the controller.

12 Claims, 15 Drawing Sheets

(56) References Cited

U.S. PATENT DOCUMENTS

| | | | |
|---|---|---|---|
| 2013/0294306 A1* | 11/2013 | Borges | H04W 52/0216 |
| | | | 370/311 |
| 2018/0041075 A1 | 2/2018 | Kaechi | |
| 2018/0222343 A1 | 8/2018 | Uchida | |
| 2021/0218074 A1 | 7/2021 | Aoki et al. | |
| 2021/0410222 A1 | 12/2021 | Numata | |
| 2022/0200069 A1 | 6/2022 | Asami et al. | |
| 2023/0223607 A1 | 7/2023 | Aoki et al. | |
| 2024/0322269 A1 | 9/2024 | Aoki et al. | |

OTHER PUBLICATIONS

Shimojima, Takehiko, "Hack Your Surroundings with Stylish IoT Devices! Featured M5Stack Palm-Sized Measurement Monitor, Part 7: Operating the New Compact M5StackC," Interface Sep. 2019, CQ Publishing Co., Ltd., Sep. 1, 2019, vol. 45, No. 9, pp. 142-147 (and partial English translation).
U.S. Appl. No. 17/896,200, filed Aug. 26, 2022, Shigemori et al.
U.S. Appl. No. 17/896,217, filed Aug. 26, 2022, Shigemori et al.
U.S. Appl. No. 17/896,198, filed Aug. 26, 2022, Shigemori et al.
U.S. Appl. No. 17/896,261, filed Aug. 26, 2022, Nakagawa et al.
U.S. Appl. No. 17/896,179, filed Aug. 26, 2022, Ohata et al.
U.S. Appl. No. 17/896,186, filed Aug. 26, 2022, Moriya et al.
U.S. Appl. No. 17/896,239, filed Aug. 26, 2022, Shigemori et al.
U.S. Appl. No. 17/896,203, filed Aug. 26, 2022, Nakata et al.

* cited by examiner

SYSTEM AND METHOD FOR BATTERY MANAGEMENT

CROSS REFERENCE TO RELATED APPLICATION

The present application is based on and incorporates herein by reference Japanese Patent Application No. 2021-139721 filed on Aug. 30, 2021.

TECHNICAL FIELD

The present disclosure relates to a system and method for battery management.

BACKGROUND

A battery management system uses wireless communication.

SUMMARY

According to an aspect of the present disclosure, a battery management system includes at least one monitoring device and a controller. The at least one monitoring device is arranged in a housing accommodating a battery to monitor the battery and acquires battery monitoring information that includes information indicating a state of the battery. The controller performs wireless communication with the at least one monitoring device and executes a predetermined process based on the battery monitoring information. The at least one monitoring device inserts the battery monitoring information in a packet and transmits the packet to the controller during a period of a connection process executed for establishing the wireless communication between the at least one monitoring device and the controller.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
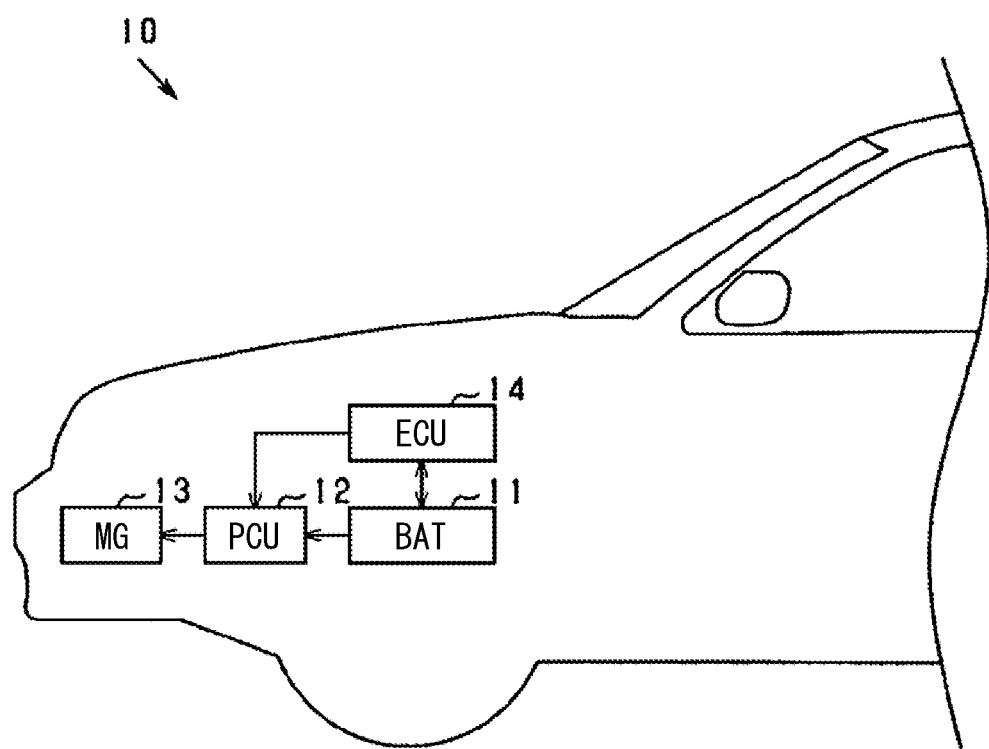
FIG. 1 is a diagram illustrating a vehicle including a battery pack.

To begin with, examples of relevant techniques will be described. A battery management system according to a comparative example uses wireless communication. The disclosure of prior art literature (U.S. Pat. No. 8,399,115 B2) is incorporated herein by reference to explain technical elements presented herein.

In the battery management system using wireless communication, wireless communication is performed between a controller and a monitoring device that monitors a state of a battery. The controller acquires battery monitoring information from the monitoring device by the wireless communication and executes a predetermined process. In the case of wireless communication, a process for connection between the monitoring device and the controller is required for the wireless communication. Therefore, an acquisition timing (i.e. acquisition start timing) of the battery monitoring information may be delayed as compared with wired communication. The delay in acquiring the battery monitoring information may cause, for example, a decrease in controllability and a delay in detection of an abnormality.

In contrast, according to the present disclosure, a system and method for battery management is capable of advancing timing of acquisition of battery monitoring information.

According to an aspect of the present disclosure, a battery management system includes at least one monitoring device and a controller. The at least one monitoring device is arranged in a housing accommodating a battery to monitor the battery and acquires battery monitoring information that includes information indicating a state of the battery. The controller performs wireless communication with the at least one monitoring device and executes a predetermined process based on the battery monitoring information. The at least one monitoring device inserts the battery monitoring information in a packet and transmits the packet to the controller during a period of a connection process executed for establishing the wireless communication between the at least one monitoring device and the controller.

According to the battery management system, the at least one monitoring device inserts the battery monitoring information in a packet and transmits the packet to the controller. As a result, timing at which the controller acquires the battery monitoring information can be advanced.

According to another aspect of the present disclosure, a method for managing a battery is disclosed. The battery is accommodated in a housing. In the method, wireless communication is performed between at least one monitoring device and a controller. The at least one monitoring device is arranged in the housing to monitor the battery and acquires battery monitoring information that includes information indicating a state of the battery. The controller executes a predetermined process based on the battery monitoring information. In the method, a connection process is executed, in which the wireless communication between the at least one monitoring device and the controller is established. After executing the connection process, a periodic communication process is executed, in which the at least one monitoring device periodically transmits the battery monitoring information to the controller. During executing the connection process, the at least one monitoring device inserts the battery monitoring information in a packet and transmits the packet to the controller.

According to the battery management method, the at least one monitoring device inserts the battery monitoring information in a packet and transmits the packet to the controller. As a result, timing at which the controller acquires the battery monitoring information can be advanced.

Hereinafter, multiple embodiments will be described with reference to the drawings. The same or corresponding elements in the embodiments are assigned the same reference numerals, and descriptions thereof will not be repeated. When only a part of the configuration is described in one embodiment, the other parts of the configuration may employ descriptions about a corresponding configuration in another embodiment preceding the one embodiment. Further, not only the combinations of the configurations explicitly shown in the description of the respective embodiments, but also the configurations of multiple embodiments can be partially combined even when they are not explicitly shown as long as there is no difficulty in the combination in particular.

First Embodiment

First, a configuration of a vehicle on which a battery management system according to the present embodiment is mounted will be described with reference to FIG. 1. Particularly, a vehicle related to a battery pack including the battery management system will be described. FIG. 1 is a diagram illustrating a schematic configuration of the vehicle. The vehicle is an electric vehicle such as a battery electric vehicle (BEV), a hybrid electric vehicle (HEV), or a plug-in hybrid electric vehicle (PHEV). The battery management system can also be applied to a mobile body other than vehicles, and, for example, can be applied to a flying body like a drone, a ship, a construction machine, or an agricultural machine. The battery management system can also be applied to stationary batteries (storage batteries) for home use, business use, and the like.

<Vehicle>

As shown in FIG. 1, a vehicle 10 includes a battery pack (BAT) 11, a PCU 12, an MG 13, and an ECU 14. "PCU" is an abbreviation for "Power Control Unit". "MG" is an abbreviation of "Motor Generator". "ECU" is an abbreviation of "Electronic Control Unit".

The battery pack 11 includes an assembled battery 20 described later, and provides a chargeable and dischargeable DC voltage source. The battery pack 11 supplies electric power to an electric load of the vehicle 10. For example, the battery pack 11 supplies the electric power to the MG 13 through the PCU 12. The battery pack 11 is charged through the PCU 12. The battery pack 11 may be referred to as a main machine battery.

For example, as illustrated in FIG. 1, the battery pack 11 is disposed in a front compartment of the vehicle 10. The battery pack 11 may be disposed in a rear compartment, under a seat, under a floor, or the like. For example, in the case of a hybrid electric vehicle, a compartment in which an engine is disposed may be referred to as an engine compartment or an engine room.

A temperature of the battery pack 11 is adjusted by air flowing into the vehicle 10 running and cooling air supplied from a fan mounted on the vehicle 10. The temperature of the battery pack 11 may be adjusted by a cooling liquid circulating inside the vehicle 10. The temperature adjustment described above reduces an excessive temperature change of the battery pack 11. The battery pack 11 may be simply coupled to a member having a large heat capacity, such as a body of the vehicle 10, in a thermally conductive manner.

The PCU 12 executes bidirectional power conversion between the battery pack 11 and the MG 13 according to a control signal from the ECU 14. The PCU 12 may be referred to as a power converter. The PCU 12 can include an inverter and a converter. The converter is disposed in an energization path between the battery pack 11 and the inverter. The converter has a function of raising and lowering the DC voltage. The inverter converts the DC voltage raised by the converter into an AC voltage such as a three-phase AC voltage, and outputs the AC voltage to the MG 13. The inverter converts the generated power of the MG 13 into a DC voltage and outputs the DC voltage to the converter.

The MG 13 is an AC rotating machine such as a three-phase AC synchronous motor in which a permanent magnet is embedded in a rotor. The MG 13 functions as a drive source for running of the vehicle 10, that is, an electric motor. The MG 13 is driven by the PCU 12 to generate a rotational driving force. The driving force generated by the MG 13 is transmitted to a drive wheel. The MG 13 functions as a generator at the time of braking of the vehicle 10 and performs regenerative power generation. The generated power of the MG 13 is supplied to the battery pack 11 through the PCU 12 and stored in the assembled battery 20 inside the battery pack 11.

The ECU 14 includes a computer including a processor, a memory, an input/output interface, a bus that connects these components. The processor is hardware for arithmetic processing. The processor includes, for example, a CPU as a core. "CPU" is an abbreviation for "Central Processing Unit". The memory is a non-transitory tangible storage medium that non-transiently stores computer-readable programs, data, and the like. The memory stores various programs to be executed by the processor.

The ECU 14 acquires information regarding the assembled battery 20 from the battery pack 11, for example, and controls the PCU 12 to control driving of the MG 13 and charging and discharging of the battery pack 11. The ECU 14 may acquire information such as a voltage, a temperature, a current, an SOC, and an SOH of the assembled battery 20 from the battery pack 11. The ECU 14 may acquire battery information such as a voltage, a temperature, and a current of the assembled battery 20 and calculate an SOC and an SOH. "SOC" is an abbreviation for "State Of Charge". "SOH" is an abbreviation for "State Of Health".

The processor of the ECU 14 executes, for example, multiple instructions included in a PCU control program stored in the memory. As a result, the ECU 14 constructs multiple functional units for controlling the PCU 12. As described above, in the ECU 14, the program stored in the memory causes the processor to execute the multiple instructions, thereby constructing the functional units. The ECU 14 may be referred to as an EVECU.

<Battery Pack>

Figure 2:
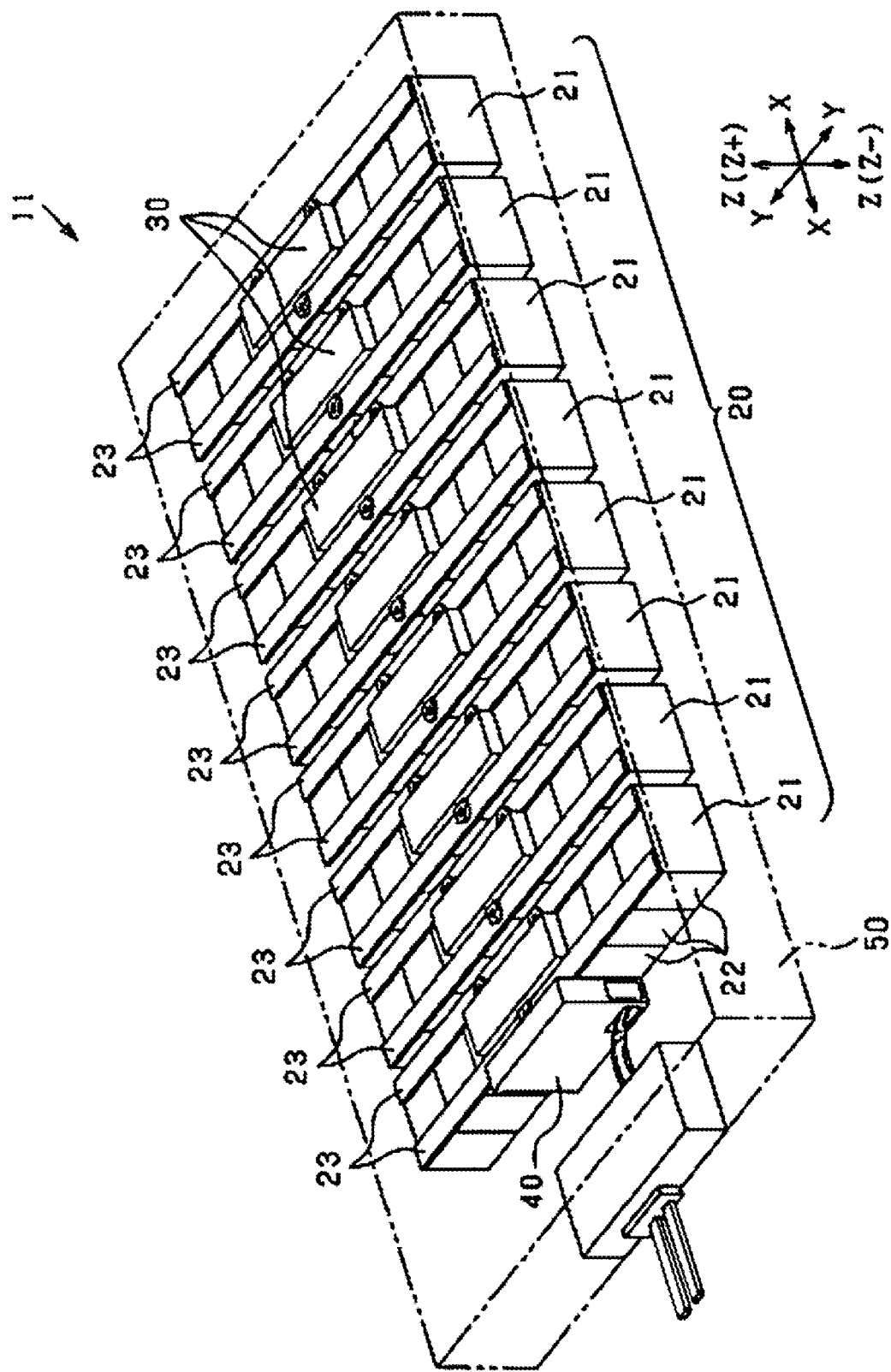
FIG. 2 is a perspective view illustrating a schematic configuration of the battery pack.
Figure 3:
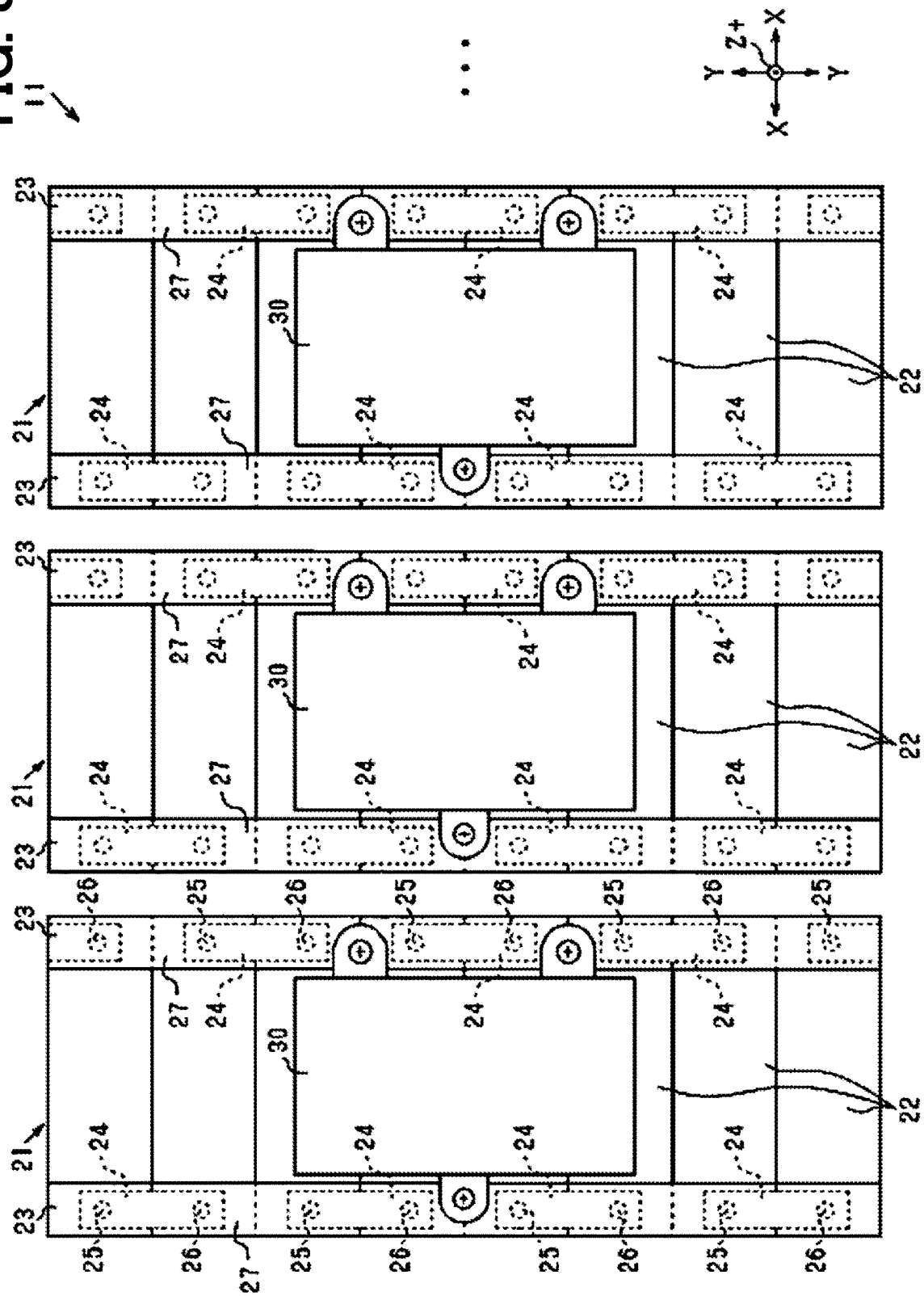
FIG. 3 is a plan view showing an assembled battery.

Next, an example of a configuration of the battery pack 11 will be described with reference to FIGS. 2 and 3. FIG. 2 is a perspective view schematically illustrating an inside of the battery pack 11. In FIG. 2, a housing 50 is indicated by a two-dot chain line. FIG. 3 is a top view illustrating an upper surface of each battery stack.

As illustrated in FIG. 2, the battery pack 11 includes the assembled battery 20, monitoring devices 30, a controller 40, and the housing 50. Hereinafter, as illustrated in FIG. 2, a longitudinal direction is referred to as an X direction, and a lateral direction is referred to as a Y direction, on a mounting surface of the housing 50 attached to the vehicle 10 that is one of surfaces of the housing 50 having a substantially rectangular parallelepiped shape. In FIG. 2, a lower surface of the housing 50 is the mounting surface. An up-down direction perpendicular to the mounting surface is referred to as a Z direction. The X direction, the Y direction, and the Z direction are arranged to be orthogonal to each other. In the present embodiment, a right-left direction of the vehicle 10 corresponds to the X direction, a front-rear direction of the vehicle 10 corresponds to the Y direction, and the up-down direction of the vehicle 10 corresponds to the Z direction. The arrangement of FIGS. 2 and 3 is merely an example, and the battery pack 11 may be arranged in any manner relative to the vehicle 10.

The assembled battery 20 includes battery stacks 21 arranged side by side in the X direction. The battery stacks 21 may be referred to as battery blocks, battery modules, or the like. The assembled battery 20 is formed by the battery stacks 21 connected in series and/or in parallel. In the present embodiment, the battery stacks 21 are connected in series.

Each battery stack 21 has battery cells 22. The battery cells 22 are accommodated in a case. As a result, the relative positions of the battery cells 22 are fixed. The case is made of metal or resin. When the case is made of metal, an electrically insulating member may be partially or entirely interposed between a wall surface of the case and the battery cells 22.

The form of the fixing member is not particularly limited as long as the relative positions of the battery cells 22 can be fixed. For example, a configuration in which the battery cells 22 are restrained by a band having a strip shape can be adopted. In this case, a separator for keeping a separation distance between the battery cells 22 may be interposed between the battery cells 22.

Each battery stack 21 includes the battery cells 22 connected in series. In the battery stack 21 of the present embodiment, the battery cells 22 arranged side by side in the Y direction are connected in series. The assembled battery 20 provides the above-described DC voltage source. The assembled battery 20, the battery stacks 21, and the battery cells 22 correspond to a battery.

Each battery cell 22 is a secondary battery that generates an electromotive voltage by a chemical reaction. A lithium ion secondary battery, a nickel-metal hydride secondary battery, an organic radical battery, or the like can be adopted as the secondary battery. The lithium ion secondary battery is a secondary battery using lithium as a charge carrier. The secondary battery that can be adopted as the battery cell 22 may be not only a secondary battery in which the electrolyte is a liquid but also a so-called all-solid-state battery using a solid electrolyte.

The battery cell 22 includes a power generating element and a battery case that accommodates the power generating element. As illustrated in FIG. 3, the battery case of each battery cell 22 is formed in a flat shape. The battery case has two end surfaces facing in the Z direction, and having a total of four lateral surfaces including two lateral surfaces facing in the X direction and two lateral surfaces facing in the Y direction. The battery case of the present embodiment is made of metal.

The battery cells 22 are stacked such that lateral surfaces of the battery cases are in contact with each other in the Y direction. Each battery cell 22 has a positive electrode terminal 25 and a negative electrode terminal 26 at different ends in the X direction. The positive electrode terminal 25 and the negative electrode terminal 26 protrude in the Z direction, more specifically, a Z+ direction that is an upward direction. The positions of the end surfaces from which the positive electrode terminal 25 and the negative electrode terminal 26 protrude are the same in the Z direction for each battery cell 22. The battery cells 22 are stacked such that the positive electrode terminals 25 and the negative electrode terminals 26 are alternately arranged in the Y direction.

Linear bus bar units 23 are disposed at both ends of an upper surface of each battery stack 21 in the X direction. The bus bar units 23 are disposed on both ends, in the X direction, of the end surfaces of the battery cases from which the positive electrode terminal 25 and the negative electrode terminal 26 protrude. That is, a pair of bus bar units 23 are disposed in each battery stack 21.

Each bus bar unit 23 includes bus bars 24 electrically connecting the positive electrode terminals 25 and the negative electrode terminals 26 alternately arranged in the Y direction, and a bus bar cover 27 covering the bus bars 24. Each bus bar 24 is a plate material made of a metal having good conductivity such as copper or aluminum. The bus bar 24 electrically connects the positive electrode terminal 25 and the negative electrode terminal 26 of the battery cells 22 adjacent to each other in the Y direction. As a result, in each battery stack 21, the battery cells 22 are connected in series.

According to such a connection structure, in each battery stack 21, one of two battery cells 22 located at the opposite ends of the battery cells 22 arranged in the Y direction has the highest potential, and the other has the lowest potential. A predetermined wire is connected to at least one of the positive electrode terminal 25 of the battery cell 22 having the highest potential and the negative electrode terminal 26 of the battery cell 22 having the lowest potential.

As illustrated in FIG. 2, the battery stacks 21 are arranged in the X direction. The positive electrode terminal 25 of the battery cell 22 having the highest potential in one of two battery stacks 21 adjacent to each other in the X direction is connected via a predetermined wire to the negative electrode terminal 26 of the battery cell 22 having the lowest potential in the other of the two battery stacks 21. Accordingly, the battery stacks 21 are connected in series.

According to such a connection structure, one of two battery stacks 21 located at the opposite ends of the battery stacks 21 arranged in the X direction becomes a highest potential battery stack 21, and the other becomes a lowest potential battery stack 21. An output terminal is connected to the positive electrode terminal 25 of the battery cell 22 having the highest potential among the battery cells 22 in the highest potential battery stack 21. An output terminal is connected to the negative electrode terminal 26 of the battery cell 22 having the lowest potential among the battery cells 22 in the lowest potential battery stack 21. These two output terminals are connected to an electric device mounted on the vehicle 10 such as the PCU 12.

Two battery stacks 21 adjacent to each other in the X direction may not be electrically connected via a predetermined wire. Any two of the battery stacks 21 arranged in the X direction may be electrically connected via a predetermined wire. The positive electrode terminal 25 and the negative electrode terminal 26 electrically connected via a predetermined wire may be same or different in position in the Y direction. That is, the positive electrode terminal 25 and the negative electrode terminal 26 may at least partially face each other or not face each other at all in the X direction. One of the positive electrode terminal 25 and the negative electrode terminal 26 may be at least partially located or be not located at all in a projected area obtained by projecting the other of the positive electrode terminal 25 and the negative electrode terminal 26 in the X direction.

Each bus bar cover 27 is formed of an electrically insulating material such as resin. The bus bar cover 27 is provided linearly from one end to the other end of the battery stack 21 along the Y direction such that the bus bar cover 27 cover the multiple bus bars 24. The bus bar cover 27 may have a partition wall. The partition wall enhances insulation between two bus bars 24 adjacent to each other in the Y direction.

The monitoring devices 30 are individually provided for the battery stacks 21. As shown in FIG. 2, a monitoring device 30 is arranged between the pair of bus bar units 23 on each of the battery stacks 21. The monitoring device 30 faces the end surface of the battery case in the Z direction, the positive electrode terminal 25 and the negative electrode terminal 26 protruding from the end surface. The monitoring device 30 and the end surface may be separated from each other in the Z direction or may face each other and be in contact with each other in the Z direction. An object such as an insulating sheet may be interposed between the monitoring device 30 and the end surface.

The monitoring device 30 is fixed to the bus bar units 23 with a screw or the like. As will be described later, the monitoring device 30 is capable of performing wireless communication with the controller 40. An antenna 37, which will be described later, included in the monitoring device 30 is disposed so as not to overlap with the bus bar units 23 in the Z direction, that is, so as to protrude more than the bus bar units 23 in the Z direction.

A material of a coupling member such as a screw for coupling the monitoring device 30 and the bus bar units 23 may be, for example, a nonmagnetic material in order to avoid interference with wireless communication. In addition to the screw, among parts provided in the battery stack 21, a part that does not particularly need to have magnetism can adopt a nonmagnetic material as its constituent material.

In the present embodiment, the monitoring devices 30 are arranged in the X direction. The monitoring devices 30 are the same in position in the Y direction. With the configuration described above, extension of the separation intervals of the monitoring devices 30 are reduced.

The controller 40 is attached to an outer side surface of a battery stack 21 disposed at one end in the X direction. The controller 40 is capable of performing wireless communication with each monitoring device 30. An antenna 42, which will be described later, included in the controller 40 is disposed at about the same height as the antenna 37 of the monitoring device 30 in the Z direction. That is, the antenna 42 of the controller 40 is provided so as to protrude more than the bus bar units 23 in the Z direction.

In the battery pack 11, the monitoring devices 30 and the controller 40 provide a battery management system 60 described later. That is, the battery pack 11 includes the battery management system 60.

In order to avoid the battery pack 11 from becoming an electromagnetic noise source, it may be necessary to reduce leakage of radio waves of wireless communication to the outside of a communication space where wireless communication between the monitoring device 30 and the controller 40 is performed. Conversely, in order to reduce interference of the wireless communication, it may be necessary to reduce entry of electromagnetic noise into the communication space.

For this reason, the housing 50 is capable of reflecting electromagnetic waves, for example. The housing 50 includes a material in order to reflect electromagnetic waves, described below as an example. For example, the housing 50 includes a magnetic material such as metal. The housing 50 includes a resin material and a magnetic material covering a surface of the resin material. The housing 50 includes a resin material and a magnetic material embedded in the resin material. The housing 50 includes carbon fibers. The housing 50 may be capable of absorbing electromagnetic waves instead of reflecting electromagnetic waves.

The housing 50 may have a hole communicating with an accommodation space inside the housing 50 and a space (external space) outside the housing 50. The hole is defined by a coupling surface that is between and connecting an inner surface and an outer surface of the housing 50. The hole is used for ventilation, extraction of a power line, and extraction of a signal line, for example. In the case of a configuration having a hole, a cover may be provided on the hole. The cover prevents communication between the accommodation space and the external space. The cover may block an entire or a part of the hole.

The cover is provided, for example, on either one of the inner surface, the outer surface, or the coupling surface of the housing 50. The cover may be disposed to face the hole so as to cover the hole, instead of being provided on either one of the inner surface, the outer surface, or the coupling surface. In a case where the cover and the hole are separated from each other, a separation gap therebetween is shorter than a length of the hole. The length of the hole is either a dimension between the inner surface and the outer surface, or a dimension in a direction orthogonal to the distance between the inner surface and the outer surface.

The cover is, for example, a connector, an electromagnetic shielding member, a sealing material, or the like. The cover includes a material described below as an example. The cover includes, for example, a magnetic material such as metal. The cover includes a resin material and a magnetic material covering a surface of the resin material. The cover includes a resin material and a magnetic material embedded in the resin material. The cover includes carbon fibers. The cover includes a resin material.

The hole of the housing 50 may be covered with at least one of elements accommodated in the accommodation space of the housing 50. A separation gap between the accommodated element and the hole is shorter than the length of the hole described above. The power line and the signal line may be disposed across the accommodation space and the external space while being held by an electrically insulating member forming a part of a wall of the housing 50.

<Battery Management System>

Figure 4:
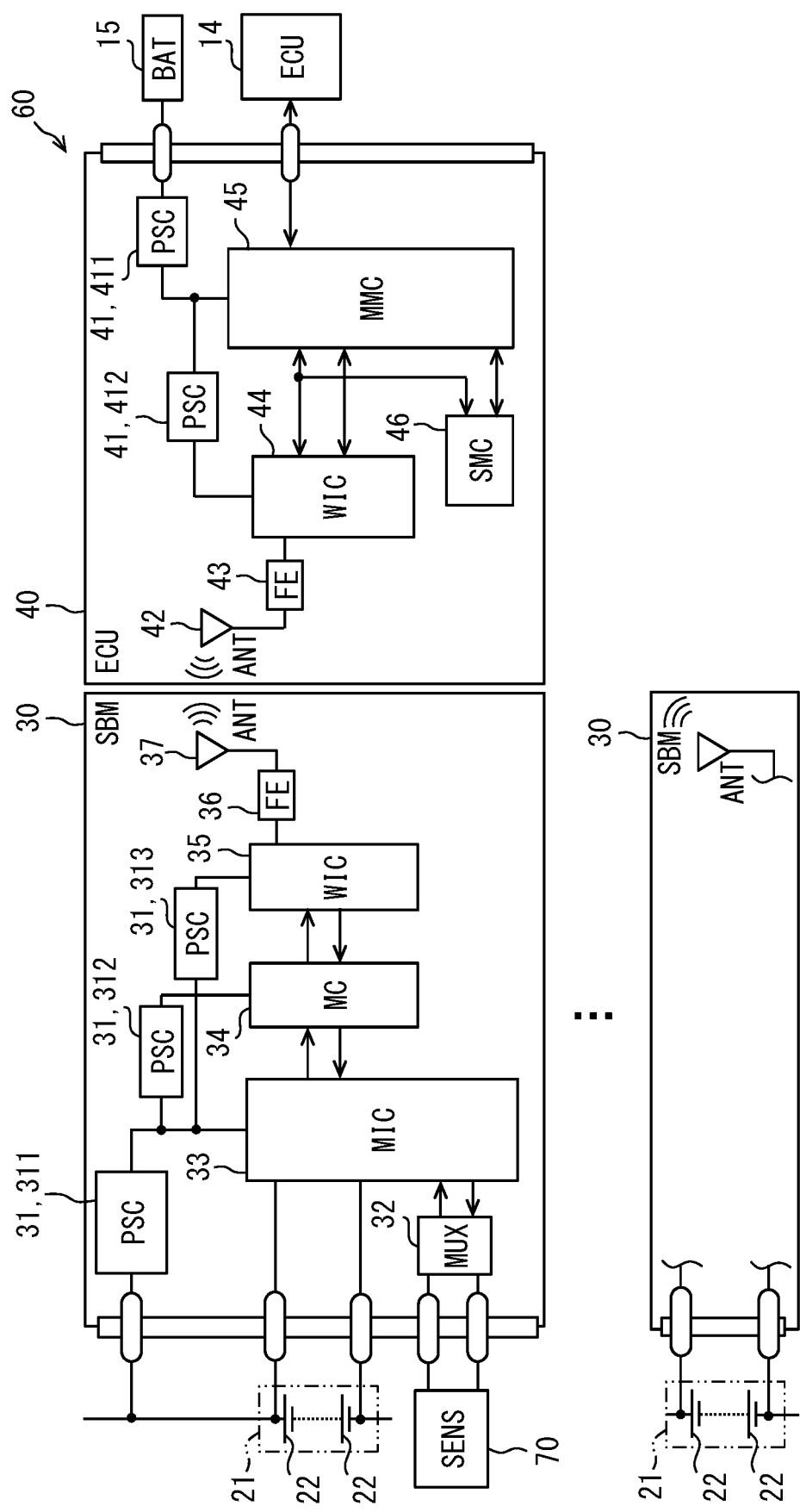
FIG. 4 is a block diagram showing a configuration of a battery management system according to a first embodiment.

Next, a schematic configuration of the battery management system will be described with reference to FIG. 4. FIG. 4 is a block diagram showing the configuration of the battery management system.

As shown in FIG. 4, the battery management system 60 includes the monitoring devices (SBMs) 30 and the controller (ECU) 40. In the following, a monitoring device may be referred to as SBM. The controller 40 may be referred to as a battery ECU or a BMU. BMU is an abbreviation for Battery Management Unit. The battery management system 60 is a system that manages batteries using wireless communication. This wireless communication uses a frequency band used in short-range communication, for example, a 2.4 GHz band or a 5 GHz band.

The battery management system 60 adopts one-to-one communication or network communication depending on the number of nodes of wireless communication performed by the monitoring devices 30 and/or the controller 40. The number of nodes may vary depending on resting states of the monitoring devices 30 and/or the controller 40. When the number of nodes is two, the battery management system 60 adopts one-to-one communication. When the number of nodes is 3 or more, the battery management system 60 adopts network communication. One example of network communication is star communication in which wireless communication is performed between one node as a master and the other nodes as slaves. Another example of network communication is chain communication in which multiple nodes are connected in series to perform wireless communication. Another example of network communication is mesh communication.

The battery management system 60 further includes a sensor 70. The sensor 70 includes a physical quantity detection sensor that detects a physical quantity of each battery cell 22, and a determination sensor. The physical quantity detection sensor includes a voltage sensor, a temperature sensor, and a current sensor, for example.

The voltage sensor includes a detection line coupled to a bus bar 24. The voltage sensor detects a voltage (cell voltage) of each of the battery cells 22. The determination sensor determines whether a correct battery is attached.

The temperature sensor is selectively provided in some of battery cells 22 included in a battery stack 21. The temperature sensor detects a temperature (cell temperature) of selected one of the battery cells 22 as a temperature of the battery stack 21. Among the battery cells 22 included in one battery stack 21, a battery cell 22 expected to have the highest temperature, a battery cell 22 expected to have the lowest temperature, a battery cell 22 expected to have an intermediate temperature are provided with the temperature sensor, for example. The number of temperature sensors for one battery stack 21 is not particularly limited.

The current sensor is provided in the battery stacks 21. The current sensor detects a current (cell current) commonly flowing through the battery cells 22 connected in series and the battery stacks 21 connected in series. In the present embodiment, one current sensor is provided because all the battery stacks 21 are connected in series. However, the number of current sensors is not limited to this example.

<Monitoring Device>

First, the monitoring devices 30 will be described. Each monitoring device 30 has a common configuration. The monitoring device 30 includes a power supply circuit (PSC) 31, a multiplexer (MUX) 32, a monitoring IC (MIC) 33, a microcontroller (MC) 34, a wireless IC (WIC) 35, a front end circuit (FE) 36, and the antenna (ANT) 37. Communication between elements within the monitoring device 30 is performed via wires.

The power supply circuit 31 uses a voltage supplied from the battery stacks 21 to generate operation power of other circuit elements included in the monitoring device 30. In the present embodiment, the power supply circuit 31 includes power supply circuits 311, 312, and 313. The power supply circuit 311 generates a predetermined voltage using the voltage supplied from the battery stacks 21 and supplies the generated voltage to the monitoring IC 33. The power supply circuit 312 generates a predetermined voltage using the voltage generated by the power supply circuit 311 and supplies the generated voltage to the microcontroller 34. The power supply circuit 313 generates a predetermined voltage using the voltage generated by the power supply circuit 311 and supplies the generated voltage to the wireless IC 35.

The multiplexer 32 is a selection circuit that selects one of detection signals of at least some of the sensors 70 included in the battery pack 11 and outputs the selected signal. The multiplexer 32 selects (switches) an input according to the selected signal from the monitoring IC 33 and outputs the input as one signal.

The monitoring IC 33 senses (acquires) battery information such as a cell voltage and a cell temperature, and transmits the battery information to the microcontroller 34. For example, the monitoring IC 33 acquires the cell voltage directly from the voltage sensor, and acquires information such as the cell temperature through the multiplexer 32. The monitoring IC 33 acquires the cell voltage and determines which battery cell 22 corresponds to the cell voltage. That is, the monitoring IC 33 acquires the cell voltage while performing cell determination. The cell current detected by the current sensor may be input to the monitoring IC 33 or may be input to the controller 40 by wired transmission.

The monitoring IC 33 may be referred to as a cell monitoring circuit (CSC). CSC is an abbreviation for Cell Supervising Circuit. The monitoring IC 33 executes malfunction diagnosis of a circuit portion of the monitoring device 30 including the monitoring IC 33 itself. That is, the monitoring IC 33 transmits battery monitoring information including battery information and malfunction diagnosis information to the microcontroller 34. The monitoring device 30 may store (retain) the acquired battery monitoring information in a memory such as the microcontroller 34. Upon receiving data requesting acquisition of the battery monitoring information transmitted from the microcontroller 34, the monitoring IC 33 senses the battery information and transmits the battery monitoring information including the battery information to the microcontroller 34. In addition to the above example, the battery monitoring information may include, for example, information such as a flue gas temperature, an impedance, a state of balancing of cell voltages, a stack voltage, a state of synchronization with the controller 40, or presence or absence of abnormality of detection wiring.

The microcontroller 34 is a microcomputer and includes a CPU as a processor, a ROM and a RAM as memories, an input/output interface, a bus that connects these components. The CPU constructs multiple functional units by executing various programs stored in the ROM while using a temporary storage function of the RAM. ROM is abbreviation for Read Only Memory. The RAM is abbreviation for Random Access Memory.

The microcontroller 34 controls a schedule of sensing and self-diagnosis performed by the monitoring IC 33. The microcontroller 34 receives the battery monitoring information transmitted from the monitoring IC 33 and transmits the battery monitoring information to the wireless IC 35. The microcontroller 34 transmits data requesting acquisition of the battery monitoring information to the monitoring IC 33. For example, upon receiving the data requesting acquisition of the battery monitoring information transmitted from the wireless IC 35, the microcontroller 34 may transmit the data requesting acquisition of the battery monitoring information to the monitoring IC 33. The microcontroller 34 may autonomously request the monitoring IC 33 to acquire the battery monitoring information. For example, the microcontroller 34 may cyclically request the monitoring IC 33 to acquire the battery monitoring information.

The wireless IC 35 includes an RF circuit and a microcontroller (not illustrated) in order to wirelessly transmit and receive data. The microcontroller of the wireless IC 35 includes a memory. The wireless IC 35 has a transmission function of modulating transmission data and oscillating at a frequency of an RF signal. The wireless IC 35 has a reception function of demodulating received data. RF is an abbreviation for Radio Frequency.

The wireless IC 35 modulates the data including the battery monitoring information transmitted from the microcontroller 34, and transmits the modulated data to another node such as the controller 40 via the front end circuit 36 and the antenna 37. The wireless IC 35 adds data necessary for wireless communication such as communication control information to the transmission data including the battery monitoring information, and then transmits the data. The data necessary for wireless communication includes, for example, an identifier (ID) and an error detection code. The wireless IC 35 controls a data size, a communication format, a schedule, and error detection in wireless communication with another node, for example.

The wireless IC 35 receives data transmitted from another node via the antenna 37 and the front end circuit 36, and then demodulates the data. For example, upon receiving data including a transmission request for battery monitoring information, the wireless IC 35 transmits data including the battery monitoring information to the other node in response to the request. In addition to the battery monitoring information described above, the monitoring device 30 may transmit battery traceability information and/or manufacturing history information to the other node. The battery traceability information is, for example, the number of charge/discharge times, the number of malfunctions, and a total charge/discharge time. The manufacturing history information is, for example, a manufacturing date, a place, a manufacturer, a serial number, and a manufacturing number. The manufacturing history information is stored in a memory included in the monitoring device 30. The monitoring device 30 may transmit the battery traceability information and/or the manufacturing history information instead of the battery monitoring information described above to the other node.

The front end circuit 36 includes a matching circuit for impedance matching between the wireless IC 35 and the antenna 37, and a filter circuit for removing unnecessary frequency components.

The antenna 37 converts an electric signal into radio waves and emits the radio waves into a space. The antenna 37 receives radio waves propagating in the space and converts the radio waves into an electric signal.

<Controller>

Next, the controller 40 will be described with reference to FIG. 4. The controller 40 includes a power supply circuit (PSC) 41, the antenna (ANT) 42, a front end circuit (FE) 43, a wireless IC (WIC) 44, a main microcontroller (MMC) 45, and a sub microcontroller (SMC) 46. Communication between elements inside the controller 40 is performed by wire.

The power supply circuit 41 uses a voltage supplied from a battery (BAT) 15 to generate an operating power source for other circuit elements included in the controller 40. The battery 15 is a DC voltage source mounted on the vehicle 10 and different from the battery pack 11. The battery 15 supplies electric power to an auxiliary machine of the vehicle 10, and therefore may be referred to as an auxiliary battery. In the present embodiment, the power supply circuit 41 includes power supply circuits 411 and 412. The power supply circuit 411 generates a predetermined voltage using the voltage supplied from the battery 15 and supplies the generated voltage to the main microcontroller 45 and the sub microcontroller 46. For simplification of the drawings, electrical connection between the power supply circuit 411 and the sub microcontroller 46 is omitted. The power supply circuit 412 generates a predetermined voltage using the voltage generated by the power supply circuit 411 and supplies the predetermined voltage to the wireless IC 44.

The antenna 42 converts an electric signal into radio waves and emits the radio waves into a space. The antenna 42 receives radio waves propagating in the space and converts the radio waves into an electric signal.

The front end circuit 43 includes a matching circuit for impedance matching between the wireless IC 44 and the antenna 42, and a filter circuit for removing unnecessary frequency components.

The wireless IC 44 includes an RF circuit and a microcontroller (not illustrated) in order to wirelessly transmit and receive data. The wireless IC 44 has a transmission function and a reception function like the wireless IC 35. The wireless IC 44 receives data transmitted from the monitoring device 30 via the antenna 42 and the front end circuit 43, and then demodulates the data. The wireless IC 44 transmits data including battery monitoring information to the main microcontroller 45. The wireless IC 44 receives and modulates data transmitted from the main microcontroller 45, and transmits the data to the monitoring device 30 via the front end circuit 43 and the antenna 42. The wireless IC 44 adds data necessary for wireless communication such as communication control information to the transmission data and transmits the data. The data necessary for wireless communication includes, for example, an identifier (ID) and an error detection code. The wireless IC 44 controls a data size, a communication format, a schedule, and error detection in wireless communication with other nodes.

The main microcontroller 45 is a microcomputer including a CPU, a ROM, a RAM, an input/output interface, and a bus that connects these components. The ROM stores various programs to be executed by the CPU. The main microcontroller 45 generates a command requesting the monitoring device 30 to perform predetermined process, and transmits transmission data including the command to the wireless IC 44. The main microcontroller 45 generates, for example, a command for requesting transmission of battery monitoring information. The main microcontroller 45 may generate a command for requesting not only acquisition of battery monitoring information but also transmission of the battery monitoring information. A request described herein may be referred to as an instruction.

The main microcontroller 45 receives data including battery monitoring information transmitted from the wireless IC 44, and performs predetermined process on the basis of the battery monitoring information. In the present embodiment, the main microcontroller 45 acquires a cell current from the current sensor, and performs predetermined process on the basis of the battery monitoring information and the acquired cell current. For example, the main microcontroller 45 performs a process of transmitting the acquired battery monitoring information to the ECU 14. The main microcontroller 45 may calculate at least one of the internal resistance, the open circuit voltage (OCV), the SOC, and the SOH of the battery cell 22 on the basis of the battery monitoring information, and transmit information including the calculated data to the ECU 14. OCV is an abbreviation for Open Circuit Voltage.

The main microcontroller 45 performs estimation process to estimate the internal resistance and the open circuit voltage of the battery cell 22 on the basis of, for example, the cell voltage and the cell current. The open circuit voltage is a cell voltage corresponding to the SOC of the battery cell 22. The open circuit voltage is a cell voltage when no current flows. The open circuit voltage and the cell voltage acquired by the monitoring device 30 have a difference by a voltage drop according to the internal resistance and the cell current. The internal resistance changes according to the cell temperature. The lower the cell temperature, the larger the value of the internal resistance. The main microcontroller 45 performs estimation process to estimate the internal resistance and the open circuit voltage of the battery cell 22 in also consideration of, for example, the cell temperature.

The main microcontroller 45 may instruct execution of balancing process for equalizing the voltages of the battery cells 22 on the basis of the battery monitoring information. The main microcontroller 45 may acquire an IG signal of the vehicle 10 and perform the above-described processes according to the driving state of the vehicle 10. "IG" is an abbreviation of "ignition". The main microcontroller 45 may perform process of detecting an abnormality of the battery cell 22 or the circuit on the basis of the battery monitoring information, and may transmit abnormality detection information to the ECU 14.

The sub microcontroller 46 is a microcomputer including a CPU, a ROM, a RAM, an input/output interface, and a bus that connects these components. The ROM stores various programs to be executed by the CPU. The sub microcontroller 46 performs a monitoring process inside the controller 40. For example, the sub microcontroller 46 may monitor data between the wireless IC 44 and the main microcontroller 45. The sub microcontroller 46 may monitor a state of the main microcontroller 45. The sub microcontroller 46 may monitor a state of the wireless IC 44.

<Periodic Communication Process>

Figure 5:
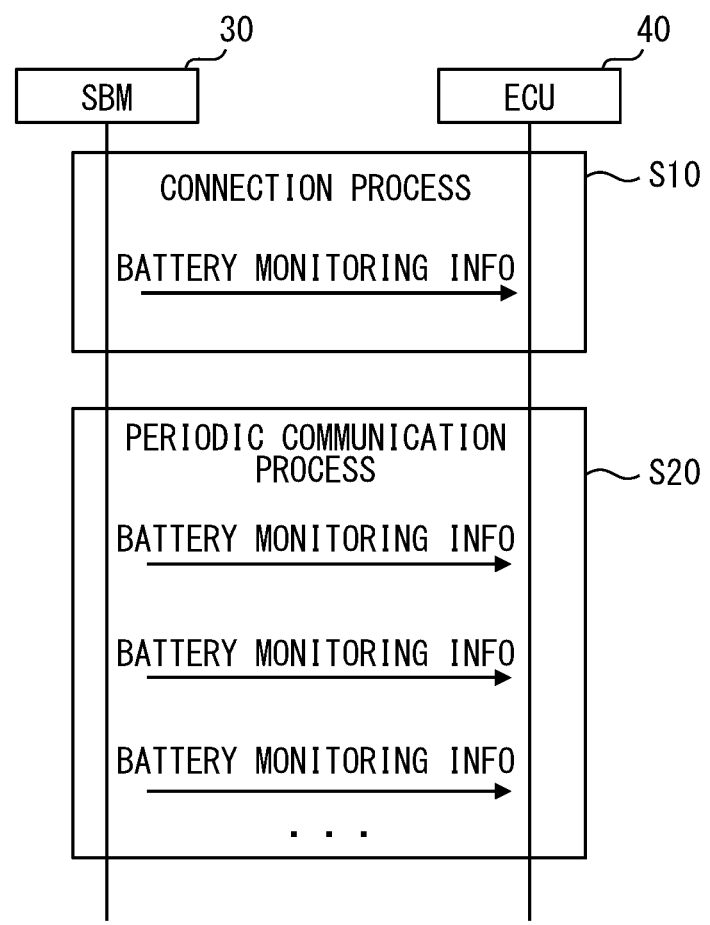
FIG. 5 is a diagram illustrating a communication sequence between a monitoring device and a controller.
Figure 6:
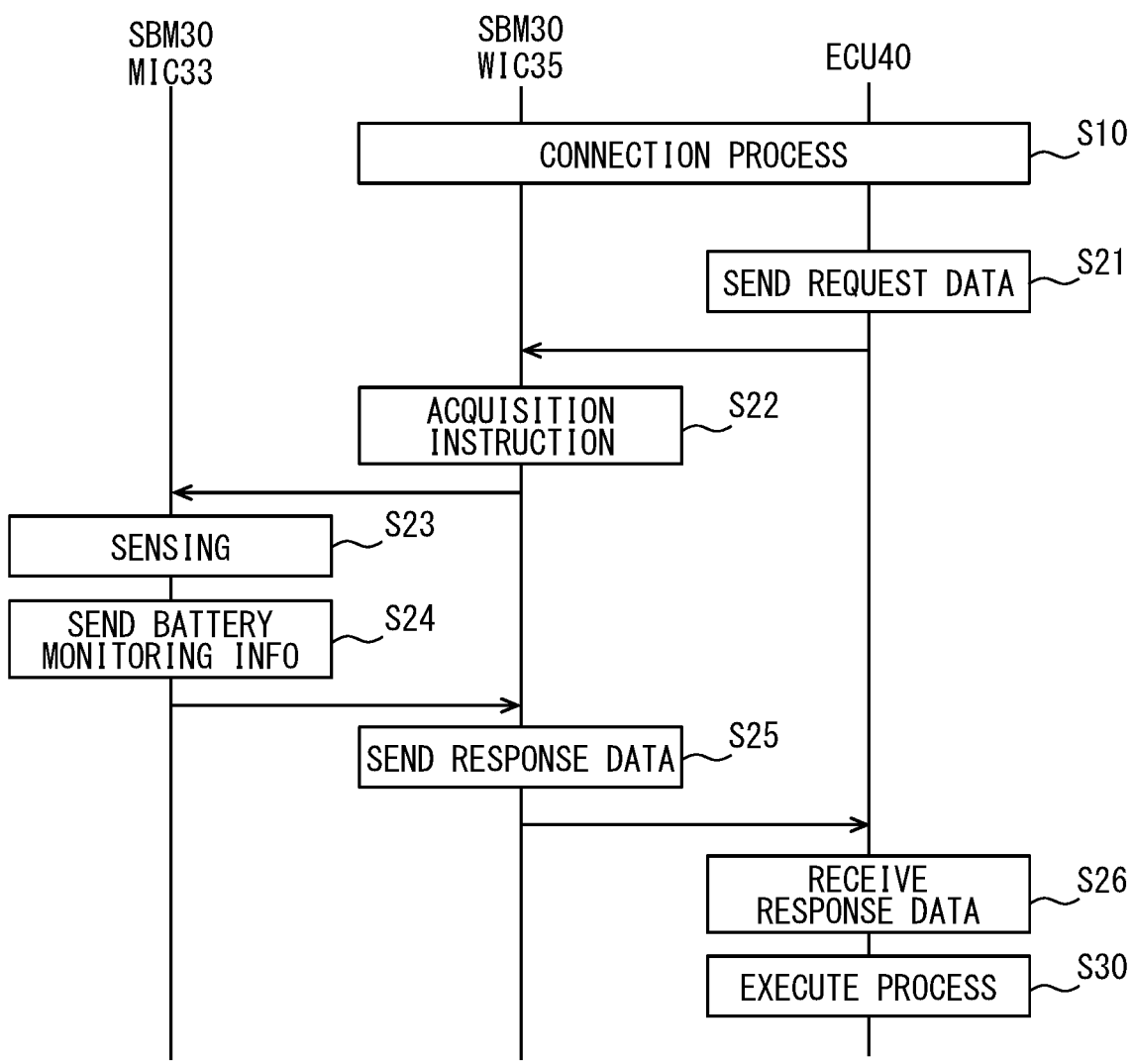
FIG. 6 is a diagram illustrating a periodic communication process.

Next, a periodic communication process will be described with reference to FIGS. 5 and 6. FIG. 5 is a diagram illustrating a communication sequence between the monitoring device 30 and the controller 40. The communication sequence may be referred to as a communication flow. FIG. 5 describes wireless communication between one monitoring device 30 and the controller 40. FIG. 6 illustrates an example of the periodic communication process. In FIG. 6, the monitoring IC 33 is shown as a MIC 33, the wireless IC 35 is shown as a WIC 35, and the controller 40 is shown as an ECU 40.

The battery management system 60 of the present embodiment performs star network communication when the number of nodes is 3 or more. That is, the controller 40 performs wireless communication with each of the monitoring devices 30. Wireless communication between one monitoring device 30 and the controller 40 will be described hereinbelow for convenience. The controller 40 performs similar processes with all the monitoring devices 30.

For performing wireless communication, the monitoring device 30 and the controller 40 first execute a connection process as shown in FIG. 5 (step S10). In step S10, the monitoring device 30 and the controller 40 make a connection of wireless communication. The connection process includes transmission of a packet from the monitoring device 30 to the controller 40. In FIG. 5, the packet transmission is indicated by a solid arrow. FIG. 5 shows only a part of the packet transmission. For convenience, packet transmission from the controller 40 is omitted. Details of the connection process will be described later.

When the connection process described above is completed, the monitoring device 30 and the controller 40 perform a periodic communication process (step S20). In step S20, the monitoring device 30 periodically and cyclically performs data communication with the controller 40. As illustrated in FIG. 6, the controller 40 transmits request data (step S21) to the monitoring device 30 that has completed the connection process with the controller 40. As an example, the controller 40 transmits request data including an acquisition request and a transmission request of battery monitoring information.

Upon receiving the request data, the wireless IC 35 of the monitoring device 30 transmits a request for acquisition of the battery monitoring information, that is, an acquisition instruction to the monitoring IC 33 (step S22). The wireless IC 35 of the present embodiment transmits the acquisition request to the monitoring IC 33 via the microcontroller 34.

Upon receiving the acquisition request, the monitoring IC 33 executes sensing (step S23). The monitoring IC 33 performs sensing and acquires battery information of each battery cell 22. The monitoring IC 33 also executes circuit malfunction diagnosis.

Next, the monitoring IC 33 transmits the acquired battery monitoring information to the wireless IC 35 (step S24). In the present embodiment, the monitoring IC 33 transmits battery monitoring information including a malfunction diagnosis result as well as battery information. The monitoring IC 33 transmits the monitoring data to the wireless IC 35 via the microcontroller 34.

When the wireless IC 35 receives the battery monitoring information that the monitoring IC 33 has acquired, the wireless IC 35 transmits transmission data including the battery monitoring information, that is, response data to the controller 40 (step S25). The controller 40 receives the response data (step S26). The controller 40 periodically performs the data communication with the monitoring device 30 to which the connection is established.

The controller 40 executes a predetermined process based on the received response data, that is, the battery monitoring information (step S30).

While an example in which the monitoring device 30 acquires battery monitoring information on the basis of an acquisition request from the controller 40 has been described, the present invention is not limited to this example. The monitoring device 30 may autonomously acquire battery monitoring information and transmit the battery monitoring information to the controller 40 on the basis of a transmission request from the controller 40. Accordingly, the process of step S22 in response to an acquisition request can be omitted.

<Connection Process>

Figure 7:
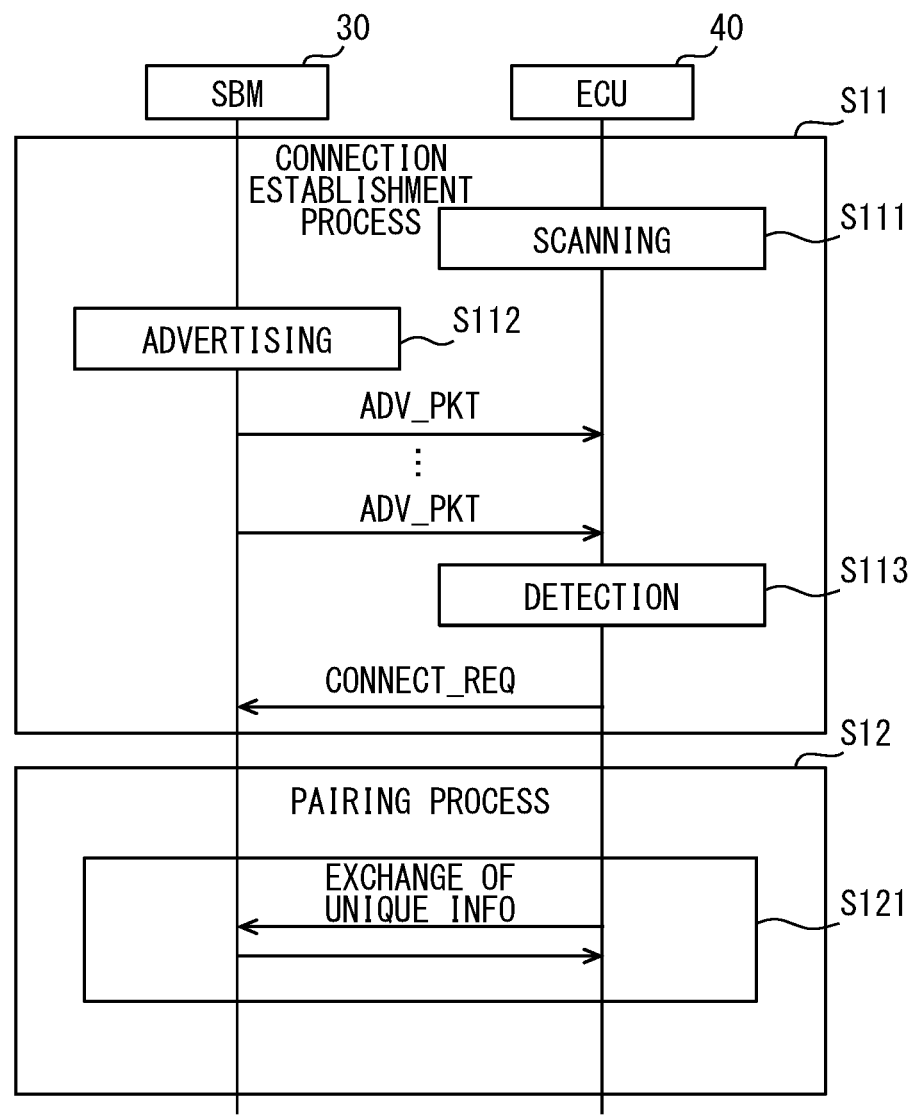
FIG. 7 is a diagram illustrating a connection process.

Next, the connection process will be described with reference to FIGS. 5 and 7. FIG. 7 illustrates an example of the connection process. In FIG. 7, similarly to FIG. 6, the wireless IC 35 is shown as a WIC 35, and the controller 40 is shown as an ECU 40.

As shown in FIG. 7, the connection process (step S10) described above includes a connection establishment process (step S11) and a pairing process (step S12). The monitoring device 30 and the controller 40 first execute the connection establishment process.

More specifically, the controller 40 performs a scanning operation (step S111), and the monitoring device 30 performs an advertising operation (step S112). The start of the scanning operation may be earlier than the start of the advertising operation, or may be at approximately the same timing. The start of the scanning operation may be later than the start of the advertising operation.

In order to notify the controller 40 of presence of the monitoring device 30, the monitoring device 30 (i.e. wireless IC 35) performs the advertising operation to transmit an advertisement packet (ADV_PKT) to the wireless IC 44 of the controller 40. The advertisement packet includes ID information of the monitoring device 30 and ID information of the controller 40.

Upon detecting the advertisement packet by the scanning operation, that is, detecting the monitoring device 30, the controller 40 transmits a connection request (CONNECT_REQ) to the detected monitoring device 30 (step S113).

When the monitoring device 30 receives the connection request, a connection is established between the one monitoring device 30 and the controller 40. When the connection is established, the monitoring device 30 stops transmitting the advertisement packet. The monitoring device 30 cyclically transmits the advertisement packet until a connection is established.

When the connection establishment process ends, a pairing process is subsequently performed. The pairing process is a process for performing encrypted data communication. The pairing process includes a unique information exchange process (step S121). In this exchange process, unique information held by each other is exchanged and stored. After the process of step S121 is performed, encryption using the exchanged unique information becomes possible. Unique information is, for example, key information or information for generating a key.

While an example in which the controller 40 performs the scanning operation and the monitoring device 30 performs the advertising operation has been described, the present invention is not limited to this example. The monitoring device 30 may perform the scanning operation, and the controller 40 may perform the advertising operation.

<Execution Timing of Connection Process>

Figure 8:
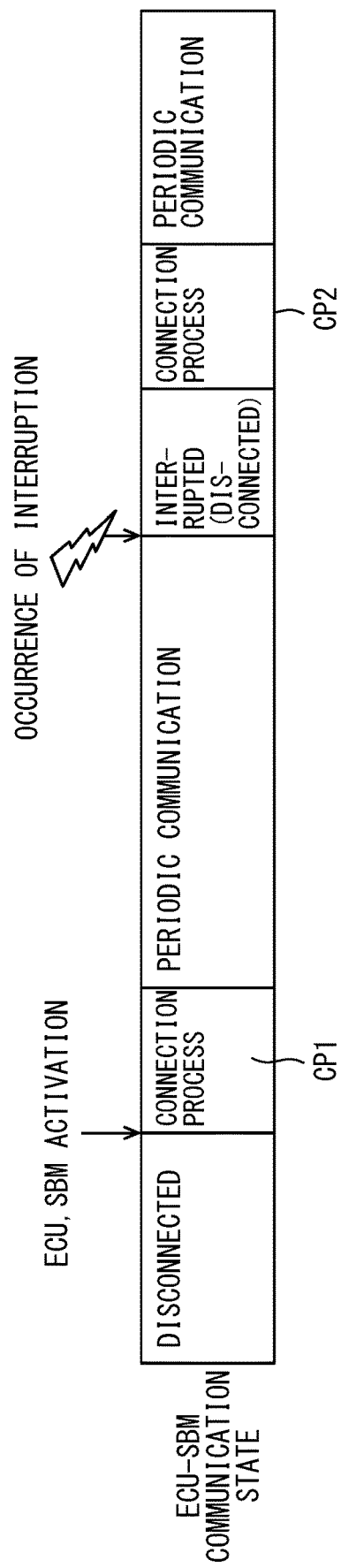
FIG. 8 is a diagram illustrating execution timing of the connection process.

Next, execution timing of the connection process will be described with reference to FIG. 8

The monitoring devices 30 and the controller 40 execute the connection process, for example, at an activation time. The activation time is when the controller 40 is supplied with an activation signal such as an IG signal or an SMR switching-on signal. For example, the activation time is when the IG signal is switched from off to on by operation by a user. SMR is an abbreviation for System Main Relay. The SMR is provided on a power line connecting the battery pack 11 and the PCU 12. The SMR is turned on to electrically connect the battery pack 11 and the PCU 12, and is turned off to disconnect the battery pack 11 and the PCU 12. At the activation time, the connection process is executed between the controller 40 and all the monitoring devices 30 that are to be connected in the wireless communication with the controller 40. The connection process CP1 shown in FIG. 8 is a connection process at the activation time.

The monitoring device 30 and the controller 40 execute the connection process when the wireless communication between the monitoring device 30 and the controller 40 is interrupted. That is, the monitoring device 30 and the controller 40 executes reconnection. The controller 40 executes the connection process with the disconnected monitoring device 30 while continuing data communication with the remaining connected monitoring devices 30. For example, an interruption occurs due to deterioration of the communication environment. The connection process CP2 shown in FIG. 8 is a connection process when the communication is interrupted.

The activation time may be, for example, a time of supply of an operation power. In a configuration in which power is constantly supplied from the battery stack 21 and the battery 15, the monitoring devices 30 and the controller 40 are started up after a manufacturing process of the vehicle 10 or the replacement of parts at a repair shop. In this case as well, the connection process is executed at the activation time. In addition, the connection process is also executed when the device is started and an intermittent process is executed during a sleep period described later.

<Transmission Timing of Battery Monitoring Information>

Next, transmission timing of the battery monitoring information will be described with reference to FIGS. 5 to 7.

As described above, in the periodic communication process, the monitoring device 30 transmits the battery monitoring information to the controller 40 in response to the request (instruction) from the controller 40.

The monitoring device 30 of the present embodiment transmits the battery monitoring information to the controller 40 during an execution period of the connection process shown in FIG. 5, in addition to the transmission of the battery monitoring information in the periodic communication process. As described above, in the connection process, the monitoring device 30 transmits multiple packets to the controller 40. The monitoring device 30 inserts the battery monitoring information in a part of the packets transmitted in the connection process.

The packet in which the battery monitoring information is inserted is not particularly limited. The monitoring device 30 may insert the battery monitoring information in a packet during the connection establishment process. For example, the advertisement packet may include the battery monitoring information, or a packet transmitted together with the advertisement packet may include the battery monitoring information. When the monitoring device 30 executes the scanning operation, the battery monitoring information may be included in the connection request (CONTECT_RET) to the controller 40.

The monitoring device 30 may insert the battery monitoring information in a packet during the pairing process. The monitoring device 30 may insert the battery monitoring information in a packet transmitted after completion of exchange of unique information. The monitoring device 30, during the connection process, may insert the battery monitoring information in a packet transmitted before the completion of the exchange of the unique information or may transmit the battery monitoring information after the completion of the exchange of the unique information. The battery monitoring information may be included in a packet of the unique information to be exchanged.

<Acquisition Timing of Battery Monitoring Information>

Figure 9:
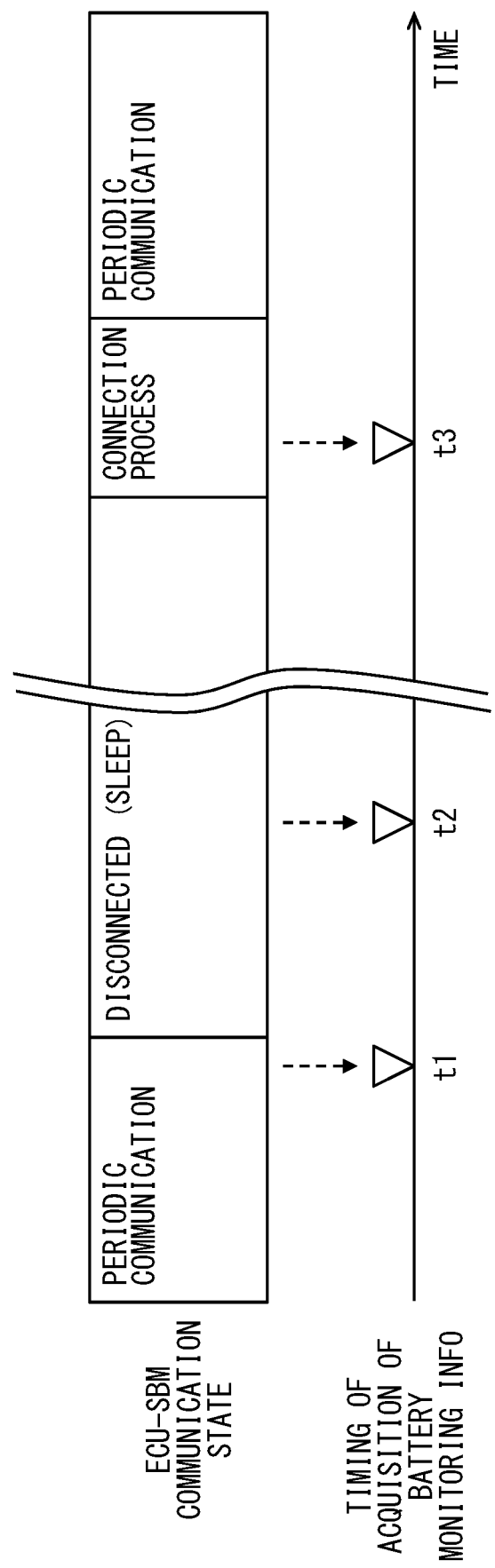
FIG. 9 is a diagram illustrating acquisition timing of battery monitoring information transmitted in the connection process.
Figure 10:
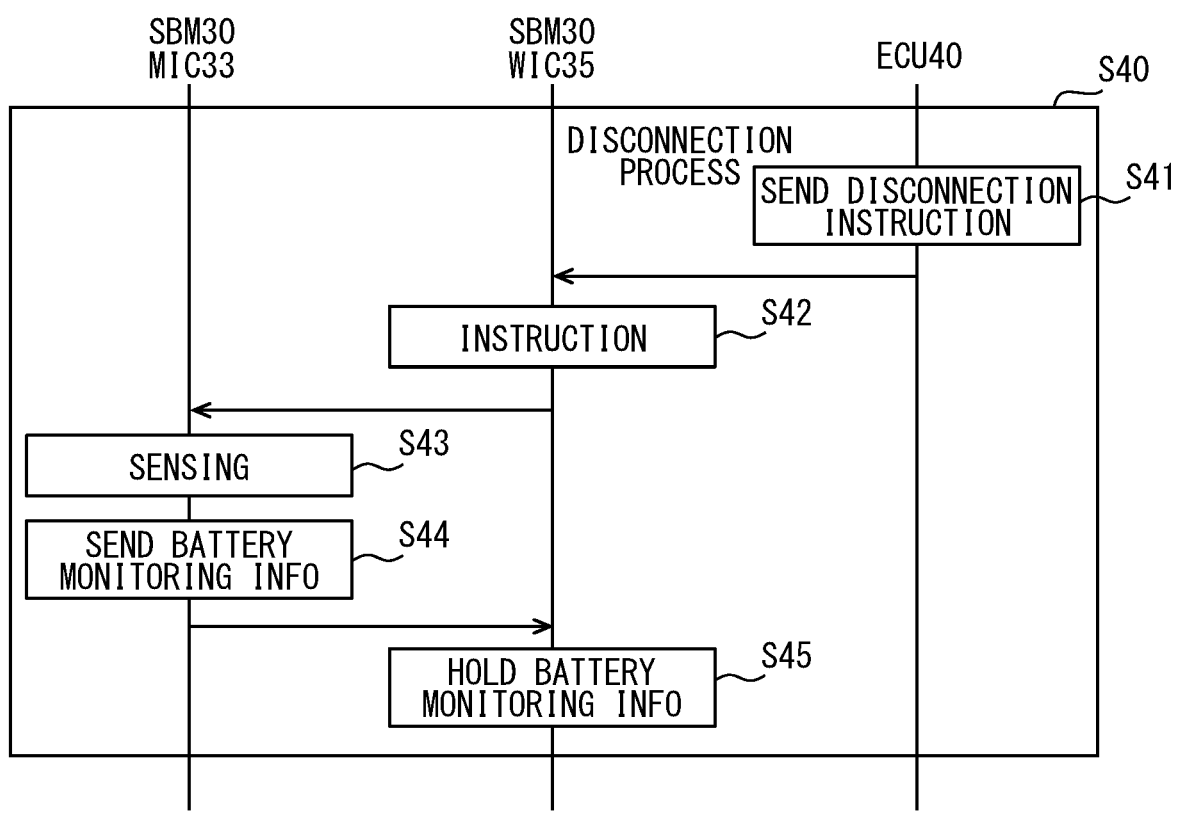
FIG. 10 is a diagram illustrating acquisition of battery information in a disconnection process.
Figure 11:
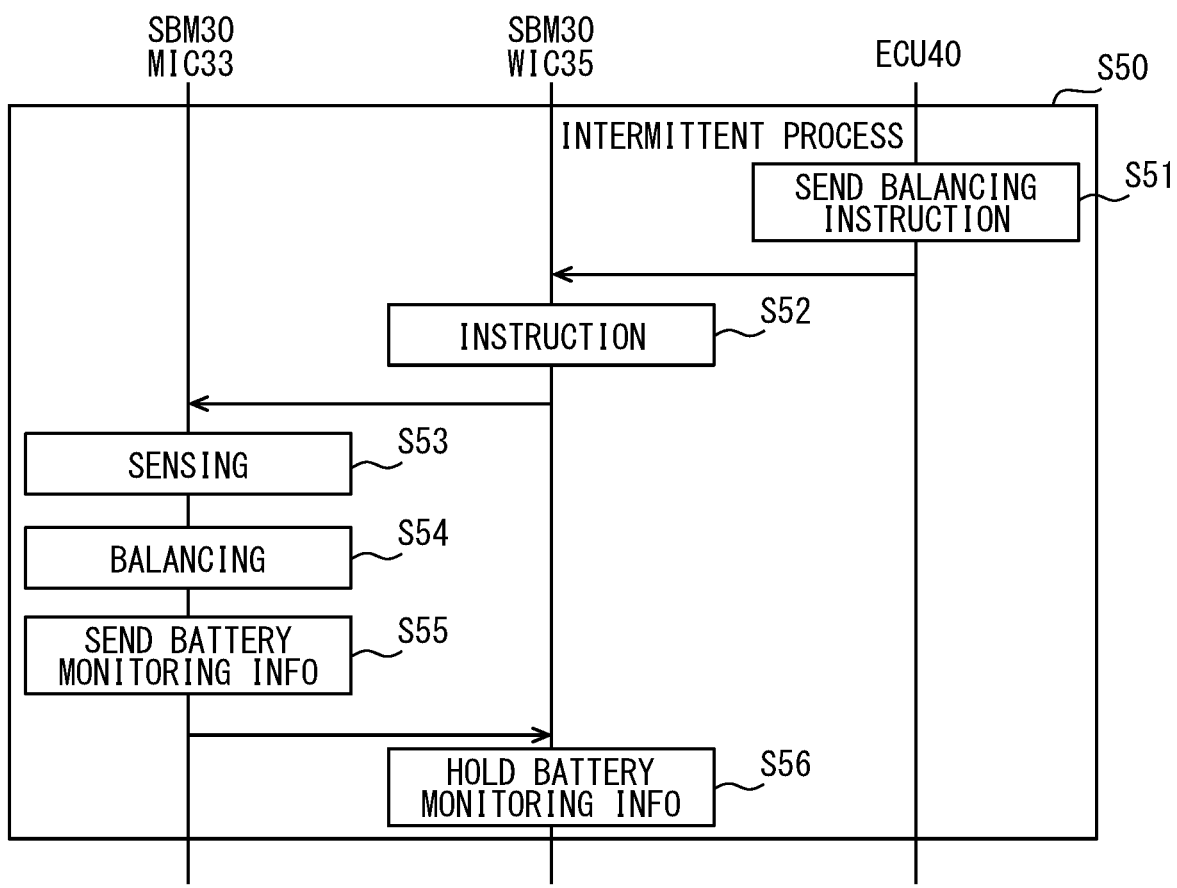
FIG. 11 is a diagram illustrating acquisition of battery information in an intermittent process.
Figure 12:
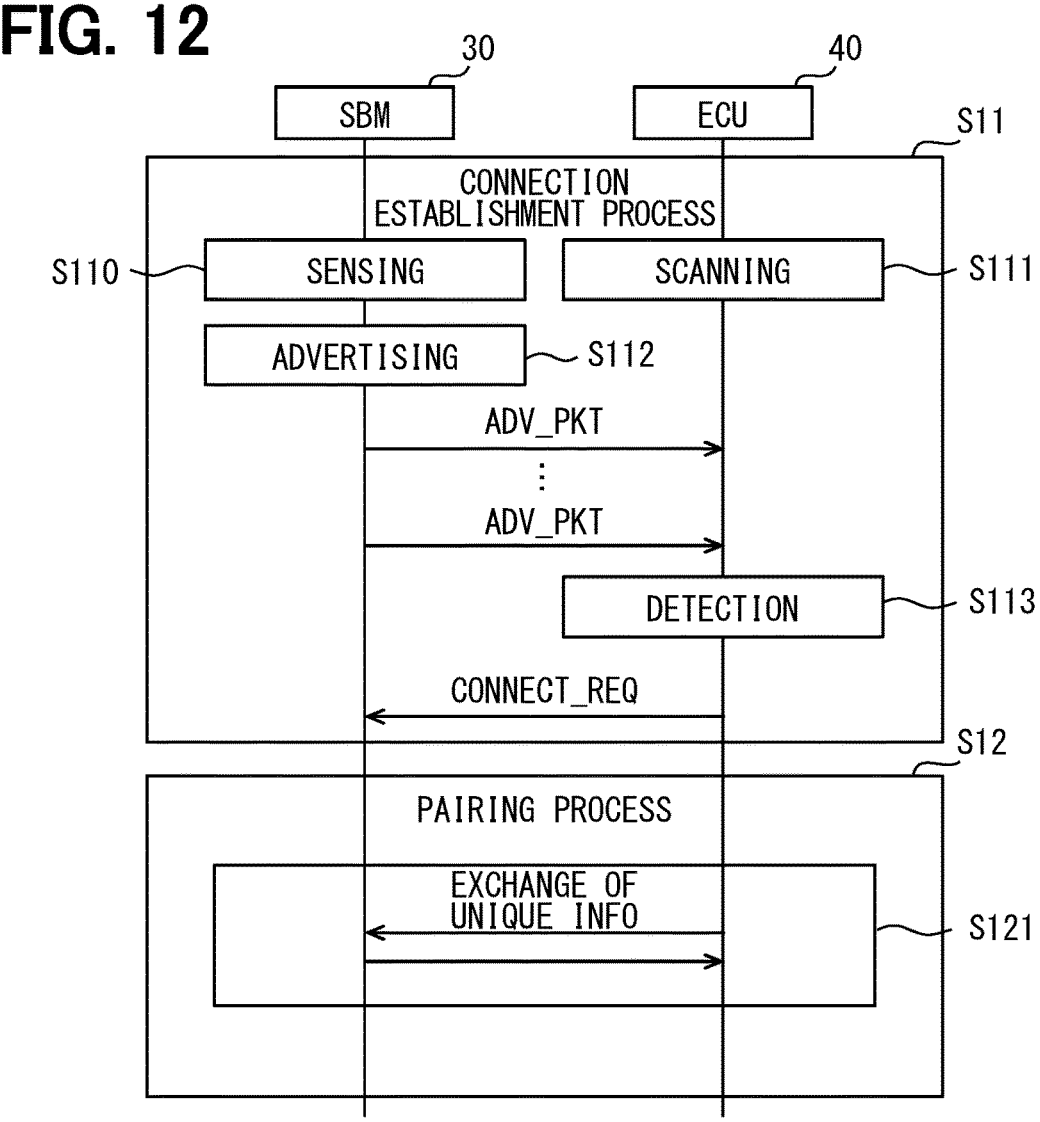
FIG. 12 is a diagram illustrating acquisition of battery information in a connection process.

Next, acquisition timing of the battery monitoring information transmitted during the connection process will be described with reference to FIGS. 9, 10, 11, and 12. FIG. 9 is a timing chart illustrating the acquisition timing of the battery monitoring information. FIG. 10 is a diagram illustrating an example of a communication sequence for acquiring the battery monitoring information. FIG. 11 is a diagram illustrating an example of the communication sequence for acquiring the battery monitoring information. FIG. 12 is a diagram illustrating an example of the communication sequence for acquiring the battery monitoring information. FIG. 10 is a communication sequence corresponding to the timing t1 shown in FIG. 9. FIG. 11 is a communication sequence corresponding to the timing t2 shown in FIG. 9. FIG. 12 is a communication sequence corresponding to the timing t3 shown in FIG. 9.

The monitoring device 30 acquires the battery monitoring information before transmitting the battery monitoring information during the connection process. At least one of the timings t1, t2 and t3 shown in FIG. 9, the monitoring device 30 acquires the battery monitoring information to be transmitted during the connection process.

The timing t1 is timing for disconnecting the wireless communication between the monitoring device 30 and the controller 40. The monitoring device 30 acquires and holds battery monitoring information when the wireless communication with the controller 40 is disconnected, and transmits the holding battery monitoring information during a next connection process. As shown in FIG. 10, the monitoring device 30 and the controller 40 execute the disconnection process at time of disconnecting the wireless communication (step S40). The disconnection process is executed at the end of the periodic communication process, for example, when the IG signal is switched from on to off.

In the disconnection process, the controller 40 first transmits data instructing the monitoring device 30 to execute the disconnection process (step S41). When the wireless IC 35 receives the instruction data, the monitoring device 30 executes the disconnection process. As one action of the disconnection process, the wireless IC 35 transmits data instructing the monitoring IC 33 to acquire battery monitoring information (step S42).

Upon receiving the instruction, the monitoring IC 33 executes sensing (step S43). The monitoring IC 33 performs sensing and acquires battery information of each battery cell 22. The monitoring IC 33 also executes circuit malfunction diagnosis. Next, the monitoring IC 33 transmits the acquired battery monitoring information to the wireless IC 35 (step S44).

When the wireless IC 35 receives the battery monitoring information acquired by the monitoring IC 33, the wireless IC 35 holds the battery monitoring information (step S45). The wireless IC 35 holds the battery monitoring information by storing it in the memory. As a result, the acquisition of the battery monitoring information at the timing t1 is completed. Then, in the next connection process, the battery monitoring information acquired in the disconnection process is inserted in a packet and transmitted to the controller 40 by the monitoring device 30 (i.e. wireless IC 35).

The battery monitoring information acquired and held by the monitoring device 30 during the disconnection process is not limited to battery monitoring information acquired by the disconnection process as a trigger. Battery monitoring information acquired immediately before executing the disconnection process may be acquired and held as the battery monitoring information to be transmitted in the next connection process. In this case, the processes of steps S42 to S44 can be omitted. The battery monitoring information acquired immediately before the disconnection is information acquired at least one time. Battery monitoring information for multiple times immediately before the disconnection may be used.

The timing t2 is execution timing of the intermittent process during the sleep period in which the wireless communication is disconnected. The monitoring device 30 and the controller 40 are activated and execute the intermittent process at predetermined time intervals during the sleep period. The monitoring device 30 and the controller 40 perform the intermittent process, for example, while the vehicle is parked. The monitoring device 30 and the controller 40 are periodically activated during the sleep period, for example, by control of a timer. The monitoring device 30 acquires battery monitoring information during the sleep period.

As shown in FIG. 11, the monitoring device 30 and the controller 40 are activated at predetermined time intervals during the sleep period to execute the intermittent process (step S50). The monitoring device 30 and the controller 40 perform, for example, SOC balancing of the battery cells 22 in the intermittent process. The predetermined time interval is not always limited to a constant time interval (fixed time interval).

In the intermittent process, the controller 40 first transmits data instructing the monitoring device 30 to execute a balancing process (step S51). Upon receiving the instruction data, the wireless IC 35 transmits the data instructing the monitoring IC 33 to execute the balancing process and acquire the battery monitoring information (step S52).

Upon receiving the request, the monitoring IC 33 executes sensing (step S53). Further, the monitoring IC 33 executes the balancing process (step S54). The monitoring IC 33 transmits the battery monitoring information acquired by the process of step S53 to the wireless IC 35 (step S55).

In the balancing process, a process for reducing voltage variations of the battery cells 22 is executed. The monitoring IC 33 discharges a battery cell 22 having a relatively high cell voltage among the battery cells 22, and charges a battery cell 22 having a relatively low cell voltage among the battery cells 22. As a result, the SOCs of the multiple battery cells 22 included in the battery stack 21 are equalized. Instead of this, among the battery cells 22, battery cells 22 other than a battery cell 22 having the lowest cell voltage may be discharged so as to have a value equal to the lowest cell voltage.

When the wireless IC 35 receives the battery monitoring information acquired by the monitoring IC 33, the wireless IC 35 holds the battery monitoring information (step S56). The wireless IC 35 holds the battery monitoring information by storing it in the memory. When the intermittent process is executed for multiple times before the next connection processing, the wireless IC 35 may update and hold the battery monitoring information, or may hold the battery monitoring information for multiple times. As a result, the acquisition of the battery monitoring information at the timing t2 is completed. Then, in the next connection process, the battery monitoring information acquired in the intermittent process is inserted in a packet and transmitted to the controller 40 by the monitoring device 30 (i.e. wireless IC 35).

Although an example in which sensing is performed before the balancing process is shown, the present invention is not limited to this. The sensing may be performed after the balancing process. The battery monitoring information may be transmitted before the balancing process as long as the sensing has been performed.

The timing t3 is timing during the connection process and before transmission of the battery monitoring information. The monitoring device 30 acquires battery monitoring information during the connection process. The monitoring device 30 (i.e. monitoring IC 33) executes sensing before executing the advertising operation, for example, as shown in FIG. 12 (step S110). The monitoring device 30 autonomously performs sensing without being instructed by the controller 40, and acquires battery monitoring information.

The timing of the sensing is not limited to the example shown in FIG. 12. The sensing may be performed any time as long as the battery monitoring information has not been transmitted. For example, when the battery monitoring information is transmitted after exchange of unique information, sensing may be executed before the exchange of the unique information. The monitoring device 30 may execute sensing multiple times.

<Overview of Battery Management System>

In the present embodiment, the monitoring device 30 and the controller 40 perform the connection process for wireless communication before performing periodic communication for sending the battery monitoring information. Then, the monitoring device 30 inserts the battery monitoring information in a packet in the connection process and transmits the packet to the controller 40. Therefore, the timing at which the controller 40 acquires the battery monitoring information can be advanced as compared with a configuration in which the battery monitoring information is transmitted only after completion of the connection process.

In a case of wireless communication, the communication speed is slower than that of wired communication, and the communication frequency is often low. By advancing the timing at which the controller 40 acquires the battery monitoring information, the timing at which the ECU 14 acquires the information from the controller 40 can be advanced. Therefore, a controllability of the PCU 12 and eventually a controllability of the MG 13 can be improved. In addition, timing of detecting an abnormality such as an abnormality in the battery cells 22 or an abnormality in the circuit can be advanced.

As described above, the monitoring device 30 may acquire battery monitoring information during the intermittent process. According to this, since the battery monitoring information is acquired before the connection process, the acquisition timing of the battery monitoring information by the controller 40 can be further advanced. In addition, time required for the connection process can be shortened. Further, since the battery monitoring information is updated by the intermittent processing at predetermined time intervals, it is possible to suppress the dissociation over time while acquiring the battery monitoring information before the connection process.

The monitoring device 30 may acquire the battery monitoring information at time of disconnecting wireless communication with the controller 40. According to this, since the battery monitoring information is acquired before the connection process, the acquisition timing of the battery monitoring information by the controller 40 can be further advanced. In addition, time required for the connection process can be shortened. In addition, the load during intermittent process can be reduced.

The monitoring device 30 may acquire battery monitoring information while the connection process is being executed. Accordingly, the acquired battery monitoring information can be timely transmitted to the controller 40. That is, the controller 40 can acquire the latest data of the battery monitoring information.

The monitoring device 30 may transmit the battery monitoring information to the controller 40 before completion of exchange of unique information for encrypted communication. According to this, the timing of acquiring the battery monitoring information by the controller 40 can be further advanced.

The monitoring device 30 may encrypt the battery monitoring information by using an encryption key stored in advance and transmit it to the controller 40. According to this, even if the wireless communication between the monitoring device 30 and the controller 40 is not encrypted, the data itself is encrypted, and therefore a risk of information leakage can be reduced.

The monitoring device 30 may transmit the battery monitoring information to the controller 40 after completion of exchange of unique information for encrypted communication. According to this, since the battery monitoring information is transmitted after encryption of the wireless communication between the monitoring device 30 and the controller 40, the risk of information leakage can be reduced.

The monitoring device 30 may insert the battery monitoring information in a packet and transmit it to the controller 40 in the connection process executed at the activation time. Accordingly, at the activation time due to an IG turning-on signal or the intermittent processing, the acquisition timing of the battery monitoring information by the controller 40 can be advanced, and thereby a controllability can be improved. Further, when the operating power is supplied, the timing of acquiring the battery monitoring information by the controller 40 can be accelerated, and the inspection time and the process can be shortened.

At the activation time by the IG turning-on signal, the monitoring device 30 may preferentially transmit a part of the battery monitoring information according to the latest state of the battery acquired the last time. For example, when the latest cell voltage acquired the last time is higher or lower than a predetermined value, the monitoring device 30 may preferentially transmit the cell voltage and/or failure diagnosis information during the connection process. Therefore, overcharging or overdischarging of the assembled battery 20 can be prevented. For example, when the latest cell temperature acquired the last time is higher or lower than a predetermined value, the monitoring device 30 may preferentially transmit the cell temperature and/or failure diagnosis information during the connection process. Hence, overheating or freezing of the assembled battery 20 can be prevented.

At the activation time for executing the intermittent process, e.g. the balancing process, the monitoring device 30 may preferentially transmit the cell temperature during the connection process. For example, when the battery cell 22 has a short-circuit failure, the cell temperature rises even during the vehicle being parked. By preferentially transmitting the cell temperature, the assembled battery 20 can be prevented from overheating. Since the cell voltage also shows an abnormal value at the time of a short-circuit failure, the cell voltage may be preferentially transmitted instead of the cell temperature.

The monitoring device 30 may insert the battery monitoring information in a packet and transmit it to the controller 40 in a connection process that is executed at the time of reconnection after the communication is interrupted. When the assembled battery 20 is in use at the time of the reconnection, the monitoring device 30 may preferentially transmit the cell voltage and/or failure diagnosis information during the connection process. Since the assembled battery 20 is used just before the communication is interrupted, it is determined that there is no sudden change in cell temperature, and the monitoring device 30 preferentially transmits the cell voltage and/or failure diagnosis information. Therefore, overcharging or overdischarging of the assembled battery 20 can be prevented.

When the assembled battery 20 is not in use at the time of the reconnection, the monitoring device 30 may preferentially transmit the cell temperature during the connection process. Since the assembled battery 20 is not used, battery information is basically unnecessary, but since a temperature rise due to a malfunction of the battery cell 22 may be desired to be avoided, the cell temperature may be preferentially transmitted. Therefore, the assembled battery 20 can be prevented from overheating. Even if the cell voltage is preferentially transmitted instead of the cell temperature, the same effect can be obtained.

The monitoring device 30 transmits the battery monitoring information at least once during the connection process. The monitoring device 30 may transmit battery monitoring information of multiple acquisitions during the connection process. The monitoring device 30 may transmit the battery monitoring information of multiple acquisitions in one packet, or may transmit the battery monitoring information individually. Such transmission of the battery monitoring information of multiple acquisitions can enhance the above-mentioned effect. The monitoring device 30 may transmit, for example, battery monitoring information of multiple acquisitions immediately before disconnection. The monitoring device 30 may transmit the battery monitoring information of multiple acquisitions at times of the intermittent processes. The monitoring device 30 may transmit battery monitoring information of multiple acquisitions by executing sensing multiple times during the connection process.

<Inspection System>

Figure 13:
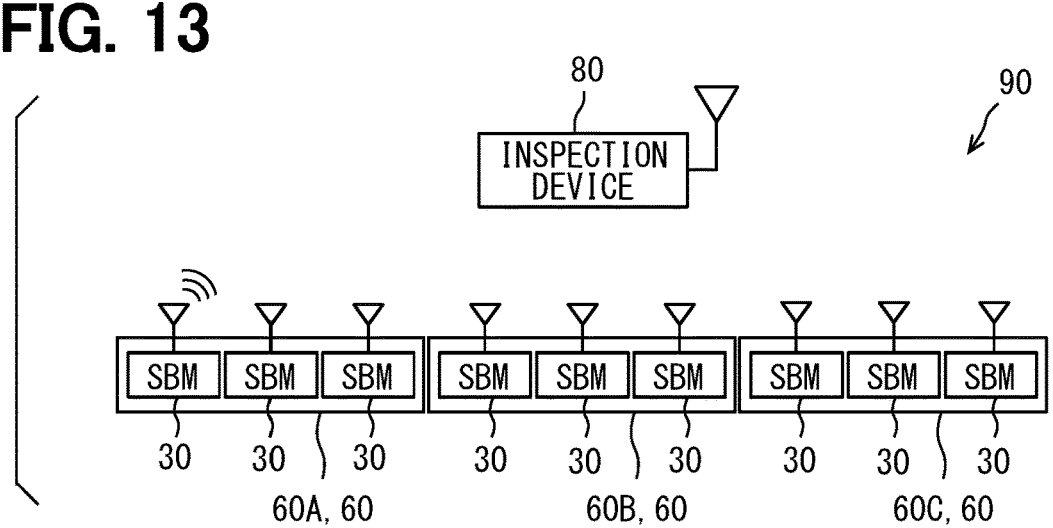
FIG. 13 is a diagram illustrating an inspection system.

The assembled battery 20 (battery cell 22) described above is inspected (i.e. diagnosed) and determined whether the assembled battery 20 is reusable by an inspection device 80 while the assembled battery 20 is removed from the vehicle 10. As shown in FIG. 13, the inspection device 80 and the battery management system 60 removed from the vehicle 10 together with the assembled battery 20 establish an inspection system 90. The inspection device 80 inspects the assembled battery 20. The inspection system 90 includes at least one of battery management systems 60 removed from the vehicle 10 and the inspection device 80.

An inspection of the battery cell 22 by the inspection device 80 may be performed individually for the battery management systems 60, but it is efficient to perform the inspection for the multiple battery management systems 60 collectively. In the example shown in FIG. 13, the inspection system 90 includes three battery management systems 60 (60A, 60B, 60C), and the inspection device 80 collectively inspects the battery cells 22 corresponding to the battery management systems 60A, 60B, 60C.

In the inspection system 90, the inspection device 80 wirelessly communicates with each of the monitoring devices 30 and acquires battery monitoring information for inspection. This battery monitoring information includes at least the above-described battery information and the failure diagnosis information. The inspection device 80 may further acquire manufacturing history information. The manufacturing history information is, for example, a manufacturing ID (serial number) and a manufacturing date and time.

The inspection device 80 inspects a deterioration state and/or abnormality of the battery cell 22, and determines whether the battery cell 22 is reusable based on the inspection result. The inspection device 80 determines whether the battery cell 22 (i.e. assembled battery 20) is suitable for reuse or recycle. The inspection device 80 may be referred to as an inspection tool, a diagnostic device, of an external device, for example.

The battery management system 60 may be provided with at least the monitoring device 30 and the sensor 70 while the battery management system 60 is removed from the vehicle 10 together with the assembled battery 20. That is, the battery management system 60 may be configured to be capable of transmitting battery monitoring information to the inspection device 80 via wireless communication. Therefore, a configuration that does not include the housing 50 and a configuration that does not include the controller 40 may be used for the battery management system 60. Of course, the battery management system 60 may have the same configuration as when mounted on a vehicle. If the controller 40 is not provided, the inspection device 80 may acquire the cell current from the current sensor.

<Inspection Method>

When the assembled battery 20 is not connected to a load (not shown), that is, in a state where the load is not energized by the assembled battery 20, the inspection device 80 may acquire the battery monitoring information held by the monitoring device 30 via wireless communication and inspect (i.e. diagnose) a deterioration state or abnormality of the battery cell 22 to determine whether the battery cell 22 is reusable. That is, the inspection device 80 may inspect (i.e. diagnose) the deterioration state or abnormality of the battery cell 22 and determine whether the battery cell 22 is reusable based on the battery monitoring information held by the monitoring device 30 before making the wireless communication connection with the inspection device 80. The inspection device 80 may determine the reusability based on the battery monitoring information acquired by the monitoring device 30 while the load is not energized. For example, the reusability may be determined based on the cell voltage, that is, an open-circuit voltage.

The inspection device 80 inspects (i.e. determines) the deterioration state of the battery cell 22 based on, for example, the acquired manufacturing history information. The inspection device 80 inspects the deterioration state of the battery cell 22 based on, for example, an elapsed time from the manufacturing date. The inspection device 80 may perform inspection to detect presence or absence of abnormality based on the failure diagnosis information. The inspection device 80 may inspect the deterioration state of the battery cell 22 by estimating the internal resistance or the SOH of the battery cell 22 based on the battery information such as the cell voltage. For example, the internal resistance increases with deterioration of the battery cell 22.

The inspection device 80 may inspect (diagnose) the deterioration state or abnormality of the battery cell 22 and determine whether the battery cell 22 is reusable based also on an inspection result in a state where the load is energized by the assembled battery 20. Specifically, the inspection device 80 may acquire battery monitoring information from the monitoring device 30 and determine the reusability of the battery cell 22 while the assembled battery 20 is connected to the load, that is, the load is energized by the assembled battery 20.

The inspection device 80 inspects the deterioration state of the battery cell 22 by estimating the internal resistance or the SOH of the battery cell 22 based on the acquired battery information, for example. The inspection device 80 inspects abnormality of the battery cell 22 or abnormality of the monitoring device 30 based on, for example, the failure diagnosis information. When the multiple battery management systems 60 are collectively inspected, the assembled batteries 20 (i.e. battery stacks 21) of the multiple battery management systems 60 are connected in series, for example.

Figure 14:
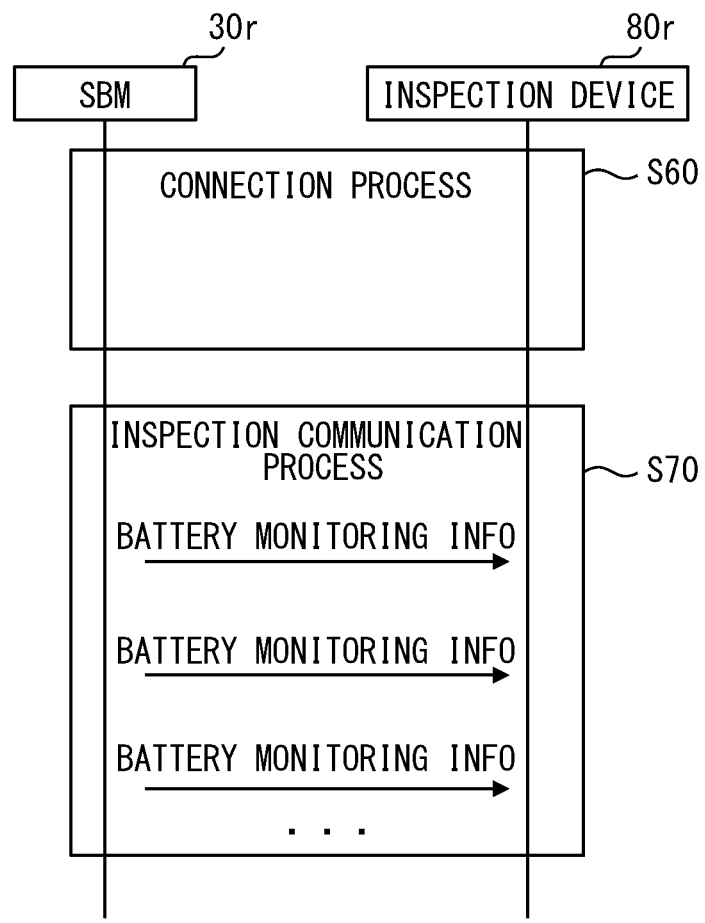
FIG. 14 is a diagram illustrating a communication sequence between a monitoring device and an inspection device according to a reference example.

FIG. 14 illustrates a communication sequence between a monitoring device 30r and an inspection device 80r according to a comparative example. In the comparative example, a character "r" is added to the end of the reference numerals of related elements in the present embodiment. Further, as for the step numbers, the same step numbers as those in FIG. 15, which will be described later, are used. In FIG. 14, the monitoring device 30r is referred to as an SBM 30r. In FIG.

14, a part of packet transmission is indicated by an arrow. For convenience, packet transmission from the inspection device 80 is omitted. The number of packets transmitted in the drawings is merely an example.

Regardless of which of the above inspections is performed, the monitoring device 30r and the inspection device 80r first execute a connection process for wireless communication (step S60). The connection process in step S60 is the same process as the connection process in step S10.

Then, after the connection process is completed, a communication process for inspection is executed (step S70). In the communication process, the monitoring device 30r transmits battery monitoring information to the inspection device 80r. In the comparative example, the inspection device 80r can acquire the battery monitoring information only after the connection process is completed, regardless of which inspection is performed. As described above, an waiting time until the battery monitoring information is acquired may be long. In particular, when multiple assembled batteries 20 are inspected together, the inspection efficiency is lowered due to the accumulation of waiting times.

Figure 15:
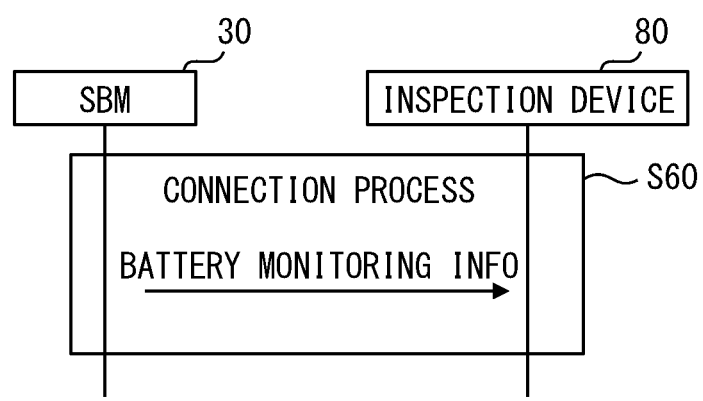
FIG. 15 is a diagram illustrating a communication sequence between a monitoring device and an inspection device in the inspection system shown in FIG. 13.

FIG. 15 illustrates an example of a communication sequence between the monitoring device 30 included in the battery management system 60 of the present embodiment and the inspection device 80. In FIG. 15, the monitoring device 30 is referred to as an SBM 30. In FIG. 15, a part of packet transmission is indicated by an arrow. For convenience, packet transmission from the inspection device 80 is omitted. The number of packets transmitted in the drawings is merely an example.

The monitoring device 30 and the inspection device 80 first execute a connection process for performing wireless communication (step S60). The connection process in step S60 is the same as the connection process in step S10, that is, the connection process between the monitoring device 30 and the controller 40. In the connection process, the inspection device 80 functions in the same manner as the controller 40 described above. In the connection process, the monitoring device 30 transmits multiple packets to the inspection device 80. The monitoring device 30 inserts the battery monitoring information in a part of the packets transmitted in the connection process.

Although not shown, for example, the inspection device 80 executes a scanning operation, and the monitoring device 30 executes an advertising operation. For example, the monitoring device 30 may insert the battery monitoring information in the advertisement packet, or may insert the battery monitoring information in the packet transmitted together with the advertisement packet. The monitoring device 30 may insert the battery monitoring information in the packet transmitted before exchange of unique information for encryption during the connection process, or may transmit the battery monitoring information after the exchange of the unique information.

In the example shown in FIG. 15, the monitoring device 30 transmits, for example, battery monitoring information at least once during the connection process. This battery monitoring information is held by the monitoring device 30 before the connection process is performed. The battery monitoring information includes the above-described battery information and the failure diagnosis information. The inspection device 80 inspects (diagnoses) the deterioration state and abnormality of the battery cell 22 and determines the reusability of the battery cell 22 based only on the battery monitoring information acquired during the connection process. The monitoring device 30 may transmit the battery monitoring information of multiple acquisitions during the connection process.

In this case, the monitoring device 30 transmits the battery monitoring information during the connection process. As a result, the timing at which the inspection device 80 acquires the battery monitoring information can be advanced. Further, the communication process for inspection shown in FIG. 14 can be omitted Therefore, a time required for the inspection of the battery cell 22 and the determination of reusability can be shortened. The inspection device 80 evenly performs wireless communication with each of the monitoring devices 30 and acquires battery monitoring information. Therefore, in determining whether a large number of battery cells 22 is reusable, the inspection time can be significantly shortened. The monitoring device 30 may transmit battery monitoring information and/or manufacturing history information. The inspection device 80 executes the inspection based on the acquired information.

Figure 16:
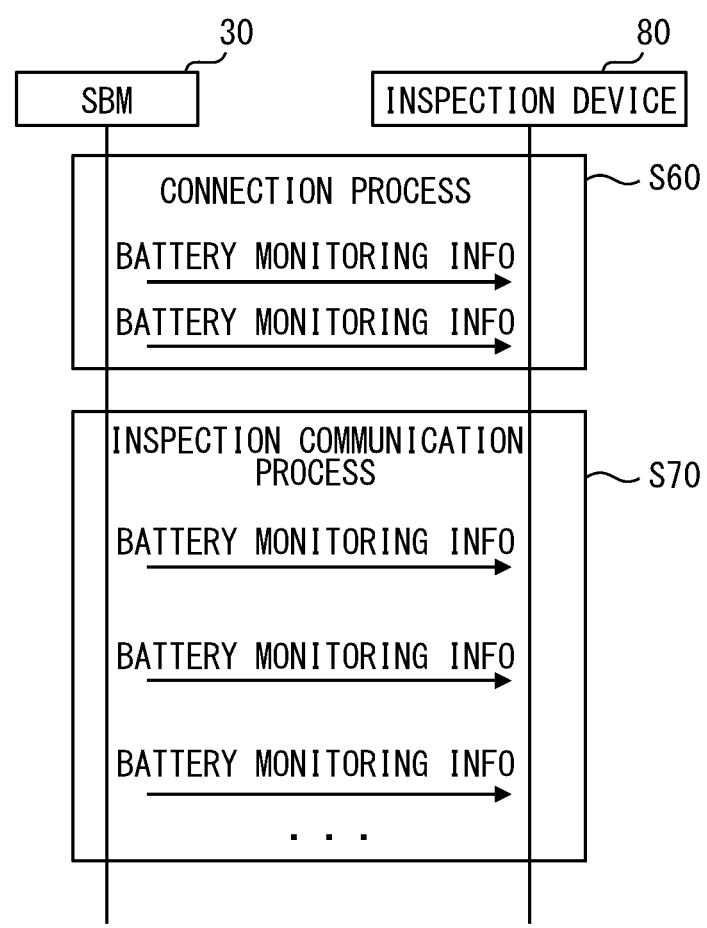
FIG. 16 is a diagram illustrating a modification.

In the example shown in FIG. 16, the monitoring device 30 executes the communication process for inspection after the connection process (step S70). The communication process in step S70 is the same as the process in step S20, that is, the periodic communication process between the monitoring device 30 and the controller 40. The inspection device 80 periodically acquires battery monitoring information from the monitoring device 30.

The monitoring device 30 transmits, for example, the battery monitoring information at least once during the connection process. This battery monitoring information is held by the monitoring device 30 before the connection process is performed. The battery monitoring information includes the above-described battery information and the failure diagnosis information. As shown in FIG. 16, the monitoring device 30 may transmit the battery monitoring information of multiple acquisitions during the connection process.

Also on this case, the monitoring device 30 transmits the battery monitoring information during the connection process. As a result, the timing at which the inspection device 80 acquires the battery monitoring information can be advanced. Therefore, a time required for the inspection of the battery cell 22 and the determination of reusability can be shortened. The inspection device 80 evenly performs wireless communication with each of the monitoring devices 30 and acquires battery monitoring information. Therefore, in determining whether a large number of battery cells 22 is reusable, the inspection time can be significantly shortened. The monitoring device 30 may transmit battery monitoring information and/or manufacturing history information. The inspection device 80 executes the inspection based on the acquired information.

A situation where the assembled battery 20 is inspected by the inspection device 80 while the assembled battery 20 and the battery management system 60 are removed from a mobile body is not limited to an inspection of the reusability of the assembled battery 20. For example, the situation may be inspection of the battery pack 11 at the time of manufacture, or an inspection at a repair shop. At the time of these inspections, the monitoring device 30 may insert the battery monitoring information in a packet and transmit it to the inspection device 80 during the connection process for wireless communication between the monitoring device 30 and the inspection device 80.

Other Embodiments

The disclosure in this specification, the drawings, and the like is not limited to the exemplified embodiments. The disclosure encompasses the illustrated embodiments and variations thereof by those skilled in the art. For example, the disclosure is not limited to the parts and/or combinations of elements shown in the embodiments. The disclosure is feasible by various combinations. The disclosure can have additional portions that can be added to the embodiments. The present disclosure encompasses the embodiments where some components and/or elements are omitted. The present disclosure encompasses replacement or combination of components and/or elements between one embodiment and another. The disclosed technical scope is not limited to the description of the embodiments. The several technical scopes disclosed are indicated by the description of the claims, and should be further understood to include meanings equivalent to the description of the claims and all modifications within the scope.

The disclosure in the specification, drawings and the like is not limited by the description of the claims. The disclosures in the specification, the drawings, and the like encompass the technical ideas described in the claims, and further extend to a wider variety of technical ideas than those in the claims. Hence, various technical ideas can be extracted from the disclosure of the specification, the drawings, and the like without being bound by the description of the claims.

When an element or layer is referred to as being "on," "coupled," "connected," or "combined," it may be directly on, coupled, connected, or combined to the other element or layer, or further, intervening elements or layers may be present. In contrast, when an element is referred to as being "directly on," "directly coupled to," "directly connected to," or "directly combined with" another element or layer, there are no intervening elements or layers present. Other terms used to describe the relationship between elements should be interpreted in a similar manner (e.g., "between" and "directly between," "adjacent" and "directly adjacent," and the like). As used herein, the term "and/or" includes any combination and all combinations relating to one or more of the related listed items. For example, the term A and/or B includes only A, only B, or both A and B.

Spatially relative terms such as "inner," "outer," "back," "below," "low," "above," and "high" are utilized herein to facilitate description of one element or feature's relationship to another element (s) or feature (s) as illustrated. Spatial relative terms can be intended to include different orientations of a device in use or operation, in addition to the orientations depicted in the drawings. For example, when a device in a drawing is turned over, elements described as "below" or "directly below" other elements or features are oriented "above" the other elements or features. Therefore, the term "below" can include both above and below. The device may be oriented in the other direction (rotated 90 degrees or in any other direction) and the spatially relative terms used herein are interpreted accordingly.

The device, the system, and the method thereof described in the present disclosure may be implemented by a special purpose computer forming a processor programmed to execute one or more particular functions embodied in computer programs. Alternatively, the apparatuses and methods described in this application may be fully implemented by special purpose hardware logic circuits. Further alternatively, the apparatuses and methods described in this application may be implemented by a special purpose computer created by a combination of a processor executing computer programs coupled with hardware logic circuits. The computer program may be stored in a computer-readable non-transition tangible recording medium as an instruction executed by a computer.

Figure 17:
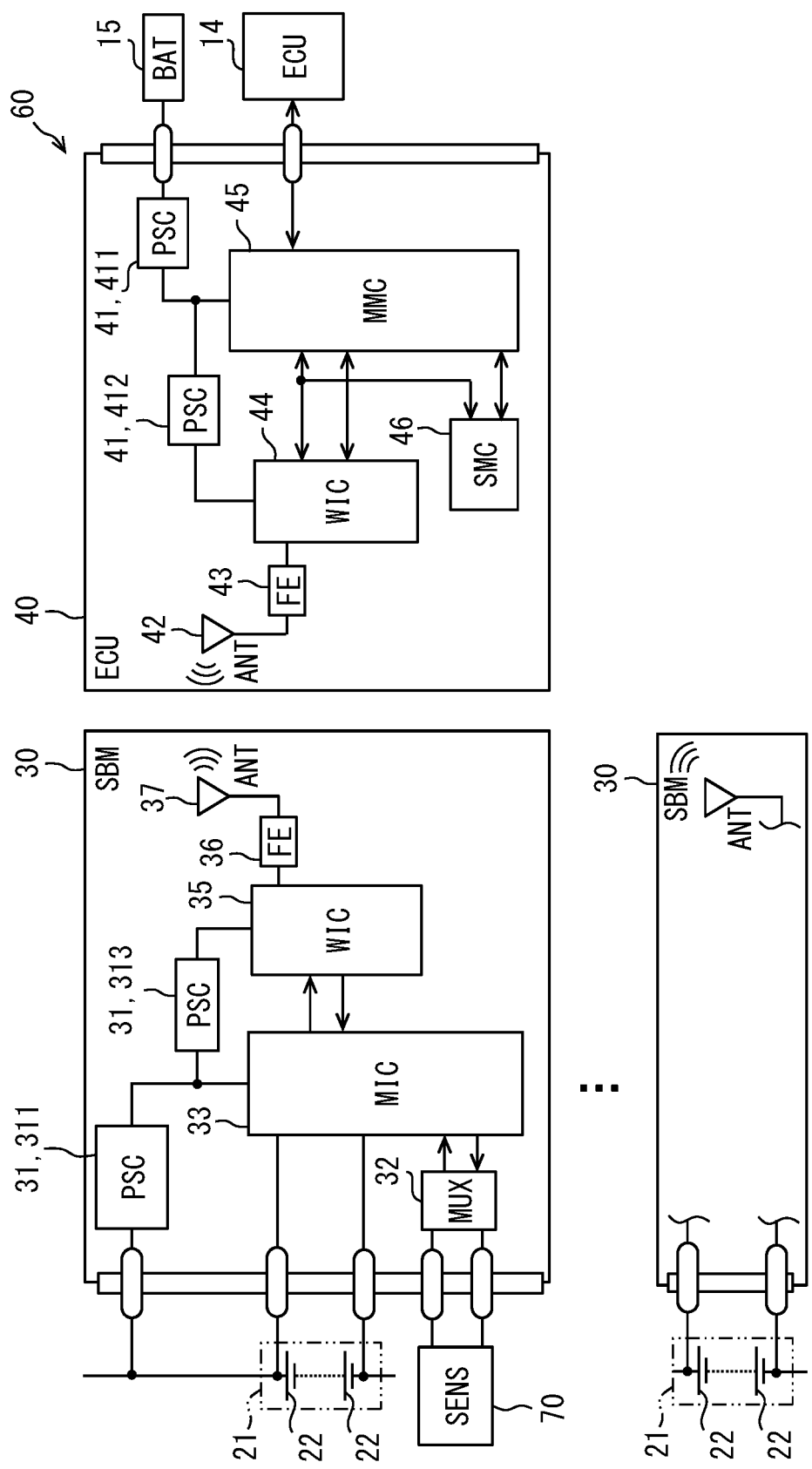
FIG. 17 is a block diagram illustrating a battery management system according to a modification.

For example, an example in which the monitoring device 30 includes the microcontroller 34 has been described, but the present disclosure is not limited thereto. As shown in FIG. 17, a battery management system 60 in which the monitoring device 30 does not include the microcontroller 34 may be adopted. FIG. 17 corresponds to FIG. 4. In this configuration, the wireless IC 35 transmits and receives data to and from the monitoring IC 33. The wireless IC 35 may execute the sensing by the monitoring IC 33 and the schedule control of the self-diagnosis, or the main microcontroller 45 of the controller 40 may execute the sensing and the schedule control.

An example of arranging the monitoring device 30 for each of the respective battery stacks 21 has been shown, but the present disclosure is not limited thereto. For example, one monitoring device 30 may be arranged for multiple battery stacks 21. Multiple monitoring devices 30 may be arranged for one battery stack 21.

While the example in which the battery pack 11 includes one controller 40 has been described, the present invention is not limited thereto. The battery pack 11 may include multiple controllers 40. That is, the battery pack 11 may include one or more monitoring devices 30 and one or more controllers 40. The battery management system 60 may include multiple sets of wireless communication systems constructed between one controller 40 and one or more monitoring devices 30.

While the example in which the controller 40 includes one wireless IC 44 has been described, the present invention is not limited thereto. The controller 40 may include multiple monitoring ICs 44. Each of the multiple wireless ICs 44 may wirelessly communicate with different monitoring devices 30.

An example has been described in which the monitoring device 30 includes one monitoring IC 33, but the present disclosure is not limited thereto. The monitoring device 30 may include multiple monitoring ICs 33. In this case, the wireless IC 35 may be provided for each of the monitoring ICs 33, or one wireless IC 35 may be provided for the multiple monitoring ICs 33.

Although an example in which the controller 40 is arranged in the housing 50 is shown, the present invention is not limited to this. The controller 40 may be arranged outside the housing 50.

The arrangement and number of the battery stacks 21 and the battery cells 22 constituting the assembled battery 20 are not limited to the above example. In the battery pack 11, the arrangement of the monitoring device 30 and/or the controller 40 is not limited to the above example.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A battery management system comprising:
   at least one monitoring device arranged in a housing accommodating a battery and configured to monitor the battery and acquire battery monitoring information that includes information indicating a state of the battery; and a controller configured to perform wireless communication with the at least one monitoring device and execute a predetermined process based on the battery monitoring information, wherein the battery monitoring information includes multiple pieces of data including a cell voltage that is a voltage of a battery cell constituting the battery, and a cell temperature that is a temperature of the battery cell, the at least one monitoring device is configured to insert the battery monitoring information in a packet and transmit the packet to the controller during a period of a connection process executed for establishing the wireless communication between the at least one monitoring device and the controller, and the at least one monitoring device is configured to prioritize transmitting the cell voltage over other data among the multiple pieces of data to the controller during a period of the connection process executed when the at least one monitoring device and the controller are activated by supply of an activation signal.

2. The battery management system according to claim 1, wherein the at least one monitoring device and the controller are configured to be activated at predetermined time intervals to execute an intermittent process during a sleep period, and the battery monitoring information transmitted by the at least one monitoring device to the controller during the period of the connection process is battery monitoring information acquired by the at least one monitoring device in the intermittent process.

3. The battery management system according to claim 1, wherein the battery monitoring information transmitted by the at least one monitoring device to the controller during the period of the connection process is battery monitoring information held by the at least one monitoring device at time of disconnection of the wireless communication between the at least one monitoring device and the controller.

4. The battery management system according to claim 1, wherein the at least one monitoring device is configured to acquire the battery monitoring information to be transmitted to the controller during the period of the connection process.

5. The battery management system according to claim 1, wherein the connection process includes exchange of unique information for encrypted communication, and the at least one monitoring device is configured to transmit the battery monitoring information before completion of the exchange of unique information.

6. The battery management system according to claim 1, wherein the connection process includes exchange of unique information for encrypted communication, and the at least one monitoring device is configured to transmit the battery monitoring information after completion of the exchange of unique information.

7. The battery management system according to claim 1, for being mounted on a mobile body, wherein the at least one monitoring device and the battery are removed from the mobile body, and the at least one monitoring device is configured to insert the battery monitoring information and/or manufacturing history information in a packet and transmit the packet to an inspection device during a period of a connection process executed for establishing wireless communication between the at least one monitoring device and the inspection device.

8. The battery management system according to claim 1, wherein the at least one monitoring device and the controller are configured to be activated at predetermined time intervals to execute an intermittent process during a sleep period, and the at least one monitoring device is configured to prioritize transmitting the cell temperature over other data among the multiple pieces of data to the controller during a period of the connection process executed when the monitoring device and the controller are activated to execute the intermittent process.

9. The battery management system according to claim 1, wherein the at least one monitoring device is configured to prioritize transmitting the cell voltage over other data among the multiple pieces of data to the controller during a period of the connection process executed when the battery is in use and the monitoring device and the controller are reconnected after disconnection of the communication.

10. The battery management system according to claim 1, wherein the at least one monitoring device is configured to prioritize transmitting the cell temperature over other data among the multiple pieces of data to the controller during a period of the connection process executed when the battery is not in use and the monitoring device and the controller are reconnected after disconnection of the communication.

11. The battery management system according to claim 1, wherein the at least one monitoring device is configured to prioritize transmitting the cell voltage over the other data to the controller when the cell voltage acquired last time is higher or lower than a predetermined value.

12. The battery management system according to claim 1, wherein the at least one monitoring device is configured to prioritize transmitting the cell voltage and failure diagnosis information over other data among the multiple pieces of data to the controller during the period of the connection process executed when the monitoring device and the controller are activated by supply of the activation signal.

* * * * *